(12) United States Patent
Meldal et al.

(10) Patent No.: US 9,428,635 B2
(45) Date of Patent: Aug. 30, 2016

(54) COATING OF HYDROXYLATED SURFACES BY GAS PHASE GRAFTING

(75) Inventors: Morten Meldal, København NV (DK); Manat Renil, Frederiksberg (DK); Steen Vesborg, Gentofte (DK)

(73) Assignee: CARLSBERG A/S, Copenhagen V (DK)

( * ) Notice: Subject to any disclaimer, the term of this patent is extended or adjusted under 35 U.S.C. 154(b) by 316 days.

(21) Appl. No.: 13/140,195

(22) PCT Filed: Dec. 16, 2009

(86) PCT No.: PCT/DK2009/050340
§ 371 (c)(1),
(2), (4) Date: Aug. 25, 2011

(87) PCT Pub. No.: WO2010/069330
PCT Pub. Date: Jun. 24, 2010

(65) Prior Publication Data
US 2012/0040112 A1   Feb. 16, 2012

(30) Foreign Application Priority Data

Dec. 16, 2008   (DK) .................. 2008 01816

(51) Int. Cl.
*C08L 1/02* (2006.01)
*C08L 1/12* (2006.01)
*C08L 1/10* (2006.01)
*C08B 3/08* (2006.01)
(Continued)

(52) U.S. Cl.
CPC ... *C08L 1/10* (2013.01); *C08B 3/08* (2013.01); *C08F 251/02* (2013.01); *D06M 13/203* (2013.01); *Y02P 20/582* (2015.11); *Y10T 428/13* (2015.01); *Y10T 428/1352* (2015.01)

(58) Field of Classification Search
None
See application file for complete search history.

(56) References Cited

U.S. PATENT DOCUMENTS 2,379,890 A  *  7/1945  Dorland ................. C08H 6/00
                                                 106/165.01
2,824,778 A     2/1958  Robbart
3,157,527 A    11/1964  Fournet et al.
(Continued)

FOREIGN PATENT DOCUMENTS

DE   44 31 350       3/1996
DE   195 32 489      3/1997
(Continued)

OTHER PUBLICATIONS

Definition of "cellulose" The free dictionary, accessed Sep. 18, 2013.*
(Continued)

*Primary Examiner* — Mandy Louie
(74) *Attorney, Agent, or Firm* — McNeill Baur PLLC

(57) ABSTRACT

A method of coating hydroxylated surfaces by gas phase grafting is described. Especially acyl groups, silyl groups and/or alkyl groups are located on the surface of materials by gas phase grafting. The grafting method is a dry process. The material to coat can be organic or inorganic materials. The produced surface coated material are strong and durable and material normally not water-proof can be water-proof due to the surface treating. Examples of items produced from surface treated material may be water-proof cardboard boxes, other containers, furniture, interior for cars and boats. Items produced from organic materials such as from plant parts are biodegradable.

15 Claims, 6 Drawing Sheets

(51) Int. Cl.
C08F 251/02 (2006.01)
D06M 13/203 (2006.01)

(56) References Cited

U.S. PATENT DOCUMENTS

| | | | | |
|---|---|---|---|---|
| 3,880,830 | A | * | 4/1975 | Marmer et al. ............... 536/63 |
| 4,107,426 | A | | 8/1978 | Gordon |
| 4,188,480 | A | * | 2/1980 | Nakamura et al. ............ 536/7.1 |
| 4,904,432 | A | * | 2/1990 | Harmer .................... A47C 5/12 264/112 |
| 4,925,698 | A | | 5/1990 | Klausner et al. |
| 5,135,965 | A | | 8/1992 | Tahan |
| 5,227,529 | A | * | 7/1993 | Neuber et al. ............... 568/319 |
| 5,368,689 | A | * | 11/1994 | Agnemo .................... 162/135 |
| 5,525,721 | A | | 6/1996 | Ohshima et al. |
| 5,876,753 | A | * | 3/1999 | Timmons et al. ............. 427/488 |
| 6,135,370 | A | | 10/2000 | Arnold |
| 6,227,473 | B1 | | 5/2001 | Arnold |
| 6,335,060 | B1 | * | 1/2002 | Inoue ........................ 427/496 |
| 6,342,268 | B1 | | 1/2002 | Samain |
| 6,405,948 | B1 | | 6/2002 | Hahn et al. |
| 6,726,133 | B2 | | 4/2004 | Hahn et al. |
| 6,991,189 | B2 | | 1/2006 | Hahn et al. |
| 8,080,135 | B2 | | 12/2011 | Abraham |
| 8,221,584 | B2 | | 7/2012 | Azer |
| 2004/0075186 | A1 | | 4/2004 | Bremser et al. |
| 2007/0014857 | A1 | | 1/2007 | Becourt et al. |
| 2012/0135170 | A1 | | 5/2012 | Meldal et al. |
| 2012/0152473 | A1 | | 6/2012 | Azer |

FOREIGN PATENT DOCUMENTS

| | | |
|---|---|---|
| DE | 10 2005 041 330 | 3/2007 |
| EP | 0 138 224 A2 | 4/1985 |
| EP | 1 967 644 | 9/2008 |
| EP | 2 378 636 | 10/2011 |
| GB | 1128696 | 10/1968 |
| GB | 1182337 | 2/1970 |
| JP | 2005-001911 | 1/2005 |
| JP | 2006-137462 | 6/2006 |
| WO | WO 91/06601 | 5/1991 |
| WO | WO 98/51694 | 11/1998 |
| WO | WO 01/23471 | 4/2001 |
| WO | WO 2010/069329 | 6/2010 |

OTHER PUBLICATIONS

IFPC "How Paper is Made" <http://www.idahoforests.org/paprmake.htm> accessed Apr. 18, 2014.*
Beveridge, James, "The manufacture of straw cellulose" Scientific American: Supplement, vol. 37 No. 959, May 19, 1894. p. 15324-15325 <https://books.google.com/books?id=U8AQAAIAAJ&pg=RA3-PA51&lpg=RA3-PA51&dq=barley+straw++paper+making&source=bl&ots=0rK05hzhy_&sig=TbV3sLCAqf6-GQ-f1dfwjNo82Bs&hl=en&sa=X&ei=T7cMVbiiLbKHsQSN6ICQCw&ved=0CDkQ6AEwBg>.*
Edgar et al., "Synthesis and Properties of Cellulose Acetoacetates." *Macromolecules vol. 28*, 1995, pp. 4122-4128.
Rhim et al., "Natural Biopolymer-Based Nanocomposite Films for Packaging Application." *Critical Reviews in Food Science & Nutrition*, vol. 47, No. 4, 2007, pp. 411-433.
Zahran et al., "Peroxydiphosphate-Metal Ion-Cellulose Thiocarbonate Redox System-Induced Graft Copolymerization of Vinyl Monomers Onto Cotton Fabric." *J. Appl. Polymer Science*, vol. 87, 2003, pp. 1879-1889.
International Search Report for Application No. PCT/DK2009/050339 mailed Apr. 27, 2010.
Andou et al., "Hydrophobic cellulose fiber surfaces modified with 2,2,3,3,3-pentafluoropropylmethacrylate (FMA) by vapor-phase-assisted photopolymerization," *Polymer Journal*, The Society of Polymer Science, Japan, 2010, vol. 42, pp. 519-524.
Begacern et al., "Recent Advances in Surface chemical Modification of Cellulose Fibres," *Journal of Adhesion Science and Technology*, Koninklijke Brill NV, Leiden, 2011, vol. 25, pp. 661-684.
Berlioz et al., "Gas-Phase Surface Esterification of Cellulose Microfibrils and Whiskers," *Biomacromolecules*, American Chemical Society, 2009, vol. 10, pp. 2144-2151.
Cunha et al., "Reversible hydrophobization and lipophobization of cellulose fibers via trifluoroacetylation," *Journal of Colloid and Interface Science*, Elsevier, 2006, vol. 301, pp. 333-336.
Karr et al., "Strawboard from vapor phase acetylation of wheat straw," *Industrial Crops and Products*, Elsevier, 2000, vol. 11, pp. 31-41.
Östenson et al., "Determination of surface functional groups in lignocellulosic materials by chemical derivatization and ESCA analysis," *Cellulose*, Springer, 2006, vol. 13, pp. 157-170.
Paunikallio et al., "Viscose Fiber/Polyamide 12 Composites: Novel Gas-Phase Method for the Modification of Cellulose Fibers with an Aminosilane Coupling Agent," *Journal of Applied Polymer Science*, Wiley Periodicals, Inc., 2006, vol. 102, pp. 4478-4483.
Roy et al., "Cellulose modification by polymer grafting: a review," *Chemical Society Reviews*, Jul. 2009, vol. 38, No. 7, pp. 2046-2064.
Sugiura et al., "Distribution Analysis of Hydroxyl Groups in Polymers by Derivatization-Electron Probe X-ray Microanalysis," *Analytical Sciences*, The Japan Society for Analytical Chemistry, Dec. 2000, vol. 16, pp. 1313-1316.
Trejo-O'Reilly et al., "The surface chemical modification of cellulosic fibres in view of their use in composite materials," *Cellulose*, Blackie Academic & Professional, 1997, vol. 4, pp. 305-320.
V.G. Nazarov, "Surface Characteristics of Modified Polymeric Materials," *Colloid Journal*, vol. 50, No. 2, 1997, pp. 206-211.
Wells et al., "The Gas Phase Derivatization of Coal," *Preprints, Fuel Chem. Div. Am. Chem. Soc.* vol. 38. No. 1. 1993. Abstract.
Yuan et al., "Surface esterification of cellulose by vapor-phase treatment with trifluoroacetic anhydride," *Cellulose*, Springer, 2005, vol. 12, pp. 543-549.
International Search Report for International Application No. PCT/DK2009/050340 mailed Jun. 10, 2010 (Form PCT/ISA/210).
International Written Opinion for International Application No. PCT/DK2009/050340 (Form PCT/ISA/237).

* cited by examiner

Fig. 1a
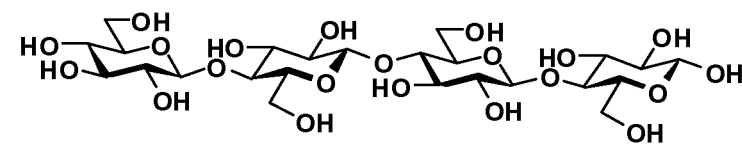
**TEA/DCM
Room Temp
12 hr**
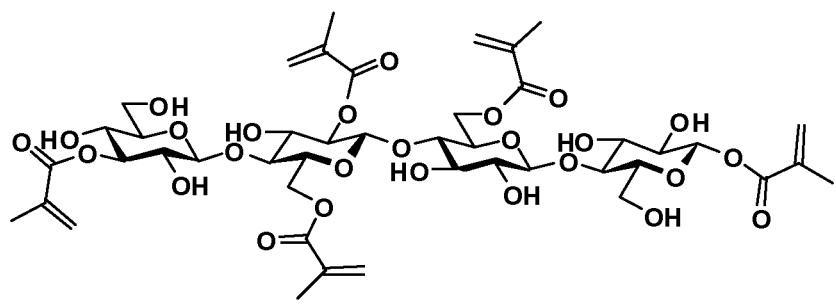
Fig. 1b
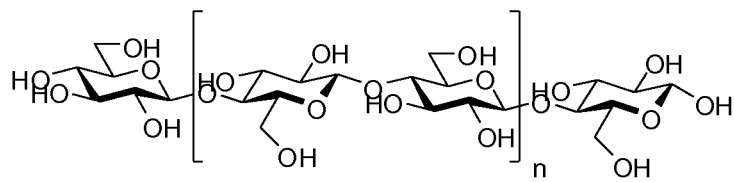
N$_2$-flow
80 °C
vapor
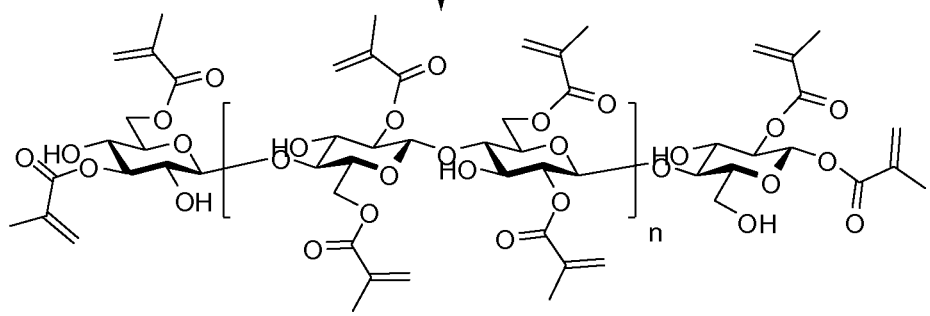

Continous gas phase grafting plant

Equipment for continous microwave assisted grafting of fibres

COATING OF HYDROXYLATED SURFACES BY GAS PHASE GRAFTING

This application is a National Stage Application of PCT/DK2009/050340, filed 16 Dec. 2009, which claims benefit of Serial No. PA 2008 01816, filed 16 Dec. 2008 in Denmark and which applications are incorporated herein by reference. To the extent appropriate, a claim of priority is made to each of the above disclosed applications.

FIELD OF INVENTION

The present invention relates to the field of coating hydroxylated surfaces by gas phase grafting. The material to coat can be organic or inorganic materials. Material especially suited to surface coat is organic or inorganic polymer materials, in particular the method is suitable to coat biodegradable polymers preferably prepared from natural fibers, for example cellulose containing fibre. The invention describes a process to surface coat the materials with compounds of acyl groups, silyl groups and/or alkyl groups by gas phase grafting.

BACKGROUND OF INVENTION

Packaging based on paper products are widely used world wide. The strength of paper products which are not water-repellant or water-proof are dependent on the humidity of the environment. An increase in the relative humidity from 50% to 80% decreases the strength measured as the load capacity of paper boxes made of a non-water-repellant paper product with about 90%.

Water-proof packaging or wrapping are generally used for packaged liquids and non-liquids which are sold in a large number world wide; however, the packaging material often is difficult to dispose of in a sustainable way.

Cellulose-based packaging materials have been used for storing liquids, in particular non-carbonated liquids. Thus, the use of TetraPak is a practical approach for using cellulose-based cartons for storing liquids. In these materials the fibers of the paper pulp are coated with a water resistant material, but the fibres of the paper pulp are not covalently anchored and chemically crosslinked because grafting is typically performed in organic solvent and is an expensive process in absence of the present invention.

The packaging materials based on cellulose as well as paper products used as water-proof packaging can be produced from products surface treated with compounds in a process including liquid solvents. The current materials are produced by impregnation of conventional cardboard sheets with different wax products and adhesive coating films.

SUMMARY OF INVENTION

The present invention relates to the field of coating hydroxylated surfaces by gas phase grafting. The invention describes a process to surface coat the materials with compounds of acyl groups, silyl groups and/or alkyl groups by gas phase grafting. The material to coat can be organic or inorganic materials. Especially, the present invention relates to the production of surface coated polymer materials by gas phase grafting. The method can be used when producing polymer materials, in particular the method is suitable for the production of biodegradable polymers prepared at least in part from natural fibers. Monomers can be grafted by the use of the gas phase grafting before these monomers are connected into polymers. Also polymers can be the material subjected to the surface coating by gas phase grafting as described herein. The method can also be used for the derivatization of other hydroxylated surfaces of inorganic fibers or granulates such as silica gels, glass fibers or particles and other hydroxylated fibers such as viscose or lignin. The polymer material to be coated by the gas phase grafting technique can be cellulose fibers which can be either purified fibers or raw materials containing cellulose fibers such as fibers produced by milling of straw from agriculture.

The invention is based on the finding that improved contact and rapid reaction with high degree of conversion can be established between a reactive reagent at low concentration in gas phase compared to that obtained in solution with minimal consumption of reagents and solvents. The gas phase reaction renders the process exceptionally simple, low cost and essentially free of waste products. Furthermore, the gas phase technique can exploit the compressibility of gasses to reach hidden cavities in plant fiber material that are not easily reached in solution where surface tension plays a dominant role.

When cellulose fibers are employed in gas phase derivatization the polymer materials obtained by use of the product of the invention in polymerization reactions are useful as substitutes for many conventional plastic materials for many applications. These include containers for liquids or packaging for other products which require a water proof packaging. They also include secondary packaging such as crates since the fiber enforced material obtained from fibers produced by the gas phase grafting technique is exceptionally strong. The polymer materials are also useful for the production of wood pulp based products such as paper, cardboard and millboard especially waterproof paper products can be produced from the surface treated polymer materials.

Furthermore, construction materials, furniture and generally molded plastic items such as interiors for the car industry can be produced from the product of the present invention.

The polymer materials produced from the products surface coated as described herein are exceptionally strong and useful for several purposes including containers for liquids and even for carbonated liquids. The polymer materials are also useful for the production of paper, cardboard and millboard especially waterproof paper products can be produced from polymer materials surface coated by the gas phase grafting.

There is a need for new and improved cellulose based polymer materials, in particular durable material, which can be disposed of in a sustainable way. Due to the cellulosic nature of the natural fiber based material the product of polymerization can be degraded by contact with soil over a period of 18 months-2 years.

In one aspect the invention relates to a method for coating hydroxylated surfaces of a material with at least one compound from the groups of acylation, silylation and/or alkylation reagents to provide esters, silyl or alkyl ethers at the surface, said method comprising the steps of a) providing a material with a hydroxylated surface, b) providing at least one reagent selected from an acylation reagent, a silylation reagent and/or an alkylation reagent, wherein the acylation reagent is selected from the group of compounds of the formula

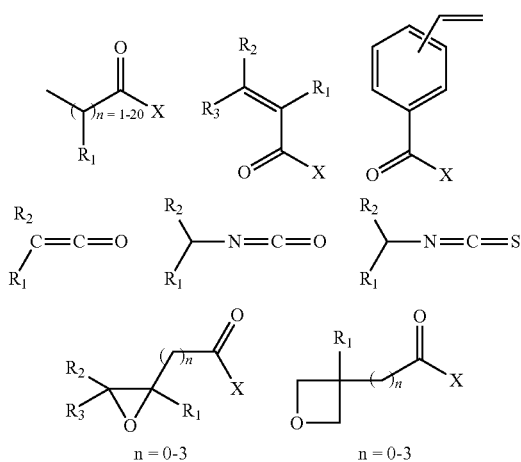

wherein X is selected from the group consisting of a halogen,

OTf,

OMs,

Mixed carbonic anhydride,

Mixed anhydride, imidazolium wherein $R_{1(acy)}$, $R_{2(acy)}$ and $R_{3(acy)}$ are selected from H, aryl, alkyl and alkenyl groups with a molecular weight of less than 150, wherein the alkylation reagent are selected from the group of compounds of the formula

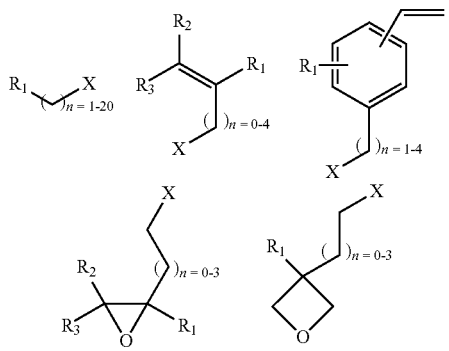

wherein X is selected from the group consisting of halogens,

Sulfonates including Tf (Trifluoromethylsulfonyl) and Ms (Methylsulfonyl), and $OCOR_4$ where $R_4$ is a lower alkyl, fluoroalkyl or alkenyl group and wherein $R_{1(alk)}$, $R_{2(alk)}$ and $R_{3(alk)}$ are selected from H, alkyl, aryl, fluoroalkyl, and alkenyl groups with a molecular weight of less than 150, wherein the silylation reagent is selected from the group of compounds of the formula

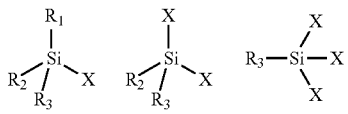

wherein X is selected from the group consisting of

Halogens $OSO_2R_4$, $NR_4R_4$, and $OR_4$ where $R_4$ is H or a lower alkyl, fluoroalkyl or alkenyl group and wherein $R_{1(Sil)}$, $R_{2(Sil)}$ and $R_{3(Sil)}$ are selected from H, phenyl, alkyl, and alkenyl groups with a molecular weight of less than 150, c) contacting said material with a hydroxylated surface with at least one of said reagents selected from an acylation reagent, a silylation reagent and/or an alkylation reagent wherein said reagent is kept in gas phase, and d) obtaining a material which at the surface comprises covalently —O-linked residues comprising an acyl group, a silyl group and/or an alkyl group.

In the text the groups $R_1$, $R_2$ and $R_3$ are described as $R_{1(acy)}$, $R_{2(acy)}$ and $R_{3(acy)}$; $R_{1(alk)}$, $R_{2(alk)}$ and $R_{3(alk)}$ and $R_{1(sil)}$, $R_{2(sil)}$ and $R_{3(sil)}$. This is to describe whether the $R_1$, $R_2$ and $R_3$ group are part of an acylation reagents (acy), alkylation reagents (alk) or silylation reagents (sil).

$R_{1(acy)}$, $R_{2(acy)}$ and $R_{3(acy)}$ are selected from lower H, aryl, alkyl and alkenyl groups. Preferably these groups are $C_{1-6}$ groups, more preferably the groups are $C_{1-3}$ groups.

$R_{1(alk)}$, $R_{2(alk)}$ and $R_{3(alk)}$ are selected from H, alkyl, aryl, fluoroalkyl, and alkenyl groups. Preferably these groups are $C_{1-6}$ groups, more preferably the groups are $C_{1-3}$ groups.

$R_{1(sil)}$, $R_{2(sil)}$ and $R_{3(sil)}$ are selected from H, phenyl, alkyl, and alkenyl groups. Preferably these groups are $C_{1-6}$ groups, more preferably the groups are $C_{1-3}$ groups.

In general in respect of the $R_1$, $R_2$ and $R_3$ groups of the acylation reagents (acy), alkylation reagents (alk) or silylation reagents (sil), the aryl groups may be selected from the group of phenyl, benzyl, tolyl, o-xylyl. Alkyl groups may be selected from the group of methyl, ethyl, propyl, butyl, pentyl, hexyl. The alkenyl groups may be selected from the group of vinyl, allyl, butenyl, pentenyl, hexenyl, butadienyl, pentadienyl, hexadienyl, 2-ethylhexenyl, 2-propyl-2-butenyl, and 4-(2-methyl-3-butene)-pentenyl. Fluoroalkyl may be any of the alkyl groups mentioned above in which one or more hydrogens have been substituted with fluorines.

In a preferred embodiment the halogen of the acylation reagent is selected from the group of F, Cl, Br.

OTf is triflate and is more formally known as trifluoromethanesulfonate ((Trifluoromethylsulfonyl), and is a functional group with the formula $CF_3SO_3$—. Triflate is also known as Otf.

OMs is Methylsulfonyl, which is a functional group with the formula $CH_3SO_2$—. It is also known as mesyl.

In a further preferred embodiment the halogen of the alkylation reagent is selected from the group of Cl, Br, I.

In another preferred embodiment the halogen of the silylation reagent is selected from the group of Cl, Br, I.

The lower alkyl, aryl, fluoroalkyl, and alkenyl groups of $R_4$ are preferably $C_{1-6}$ groups, more preferably are $C_{1-3}$ groups.

The material may be inorganic or organic as further described elsewhere herein.

The invention also relates to material, preferably with a hydroxylated surface, covered with i.e. surface coated with at least one acyl group, at least one silyl group and/or at least one alkyl group, and where the acyl group, the silyl group and/or the alkyl group are grafted onto the surface of the material by a process where the reagents are in gas phase.

Interestingly, the present invention especially provides a method for surface coating of fibers e.g. cellulose fibers for anchoring into polymer networks formed by radical polymerizations or anion or cation catalyzed ring opening polymerizations, which provides durable materials useful for many purposes as described elsewhere herein. The method is based on grafting acylating agents, silylating agents and/or alkylating agents onto the surface of hydroxylated particles or fibers, for example cellulose fibers, glass fibers or lignin in a process where the reagents are in a gas phase and mobilized by a warm carrier gas.

A preferred embodiment of the invention relates to a method for preparing a fiber material comprising cellulose fibers covalently modified at surface hydroxyls with at least one compound from the groups of acylation, silylation and/or alkylation reagents to provide esters, silyl or alkyl ethers at the fiber surface, said method comprising the steps of a) providing a compound comprising/containing cellulose b) providing at least one reagent selected from an acylation reagent, a silylation reagent and/or an alkylation reagent, wherein the acylation reagent are selected from the group of compounds of the formula

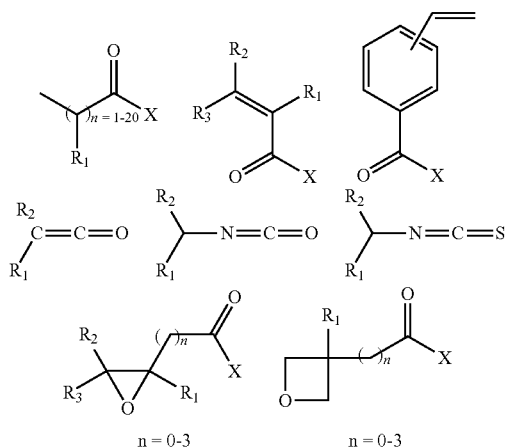

wherein X=F, Cl, Br, OTf (Trifluoromethylsulfonyl), OMs (Methylsulfonyl), OCO$_2$R, OCOR or imidazolium where R is small alkyl fluoroalkyl or alkenyl groups and wherein R$_1$, R$_2$ and R$_3$ are selected from H, aryl, alkyl and alkenyl groups of less than 150 Mw, wherein the alkylation reagent are selected from the group of compounds of the formula

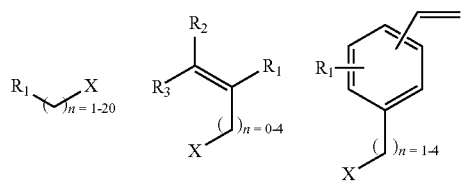

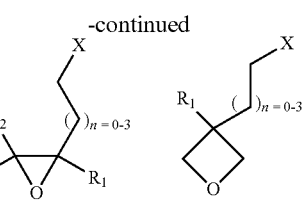

wherein X=Cl, Br, I, OSO$_2$R, OCOR where R is small alkyl fluoroalkyl or alkenyl groups and wherein R$_1$, R$_2$ and R$_3$ are selected from H, alkyl, aryl fluoroalkyl, and alkenyl groups of less than 150 Mw, wherein the silylation reagent are selected from the group of compounds of the formula

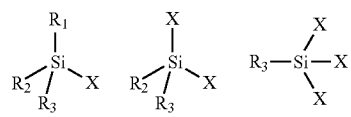

wherein X=Cl, Br, I, OSO$_2$R, NRR, OR where R is H or a small alkyl, fluoroalkyl or alkenyl groups and wherein R$_1$, R$_2$ and R$_3$ are selected from H, phenyl, alkyl, and alkenyl groups of less than 150 Mw, c) contacting said compound comprising cellulose with at least one of said reagent selected from an acylation reagent, a silylation reagent and/or an alkylation reagent wherein said reagent is kept in gas phase, and d) obtaining a material comprising cellulose covalently —O-linked to at least one residue comprising an acyl group, a silyl group and/or an alkyl group.

Furthermore, the invention relates to polymer products prepared from said surface coated fiber material, such as containers, food storage materials or paper products. The invention also relates to preparation of natural fibers for the production of fiber enforced polymers that can substitute the fossil based polymer materials currently used in many customer goods. These include polymers used in production of kitchenware, cars, furniture and construction materials,

SHORT DESCRIPTION OF DRAWINGS

FIG. 1 shows a schematic representation of a methacryloylation reaction performed in liquid or in gas phase.

DETAILED DESCRIPTION OF THE INVENTION

Surface Coating

Figure 2:
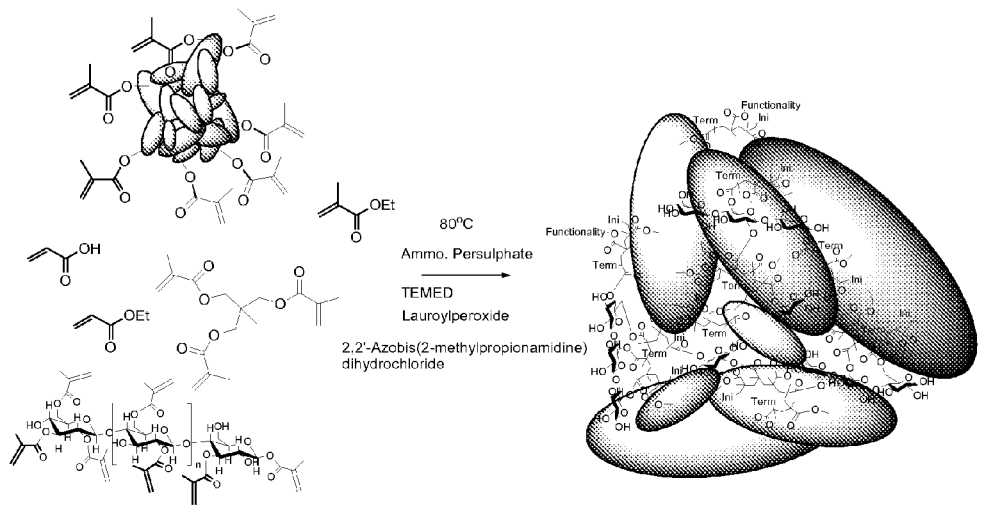
FIG. 2 shows a schematic representation of a polymerisation of surface treated materials leading to a polymer material comprising different sizes of surface treated materials.

The present invention relates to a method for surface treating or surface coating a material with hydroxylated surface with acyl groups, silyl groups and or alkyl groups as described elsewhere herein. The process leading to covalently linked surface coating is performed with the acylation reagents, silylation reagents and/or alkylation reagents in gas phase.

In a preferred embodiment the present invention relates to a method for surface treating or surface coating a polymer material comprising cellulose with acyl groups, silyl groups and or alkyl groups as described elsewhere herein. The surface treatment/coating can also be described as linking or grafting acyl groups, silyl groups and or alkyl groups to a material, which preferably is a material comprising cellulose. The process leading to covalently linked surface coating is performed with the acylation reagents, silylation reagents and/or alkylation reagents in gas phase.

One aspect of the invention relates to a method for preparing a fiber material comprising cellulose fibers covalently modified at surface hydroxyls with at least one compound from the groups of acylation, silylation and/or alkylation reagents to provide esters, silyl or alkyl ethers at the fiber surface, said method comprising the steps of
  a) providing a compound comprising/containing cellulose
  b) providing at least one reagent selected from an acylation reagent, a silylation reagent and/or an alkylation reagent,
  c) contacting said compound comprising cellulose with at least one of said reagent selected from an acylation reagent, a silylation reagent and/or an alkylation reagent wherein said reagent is kept in gas phase, and
  d) obtaining a material comprising cellulose covalently —O-linked to at least one compound of an acyl group, a silyl group and/or an alkyl group.

The gas phase grafting method can be performed by heating the material e.g. the material comprising cellulose to a suitable temperature. The acylation reagent, silylation reagent and/or alkylation reagent are vaporized and mixed with a carrier gas The gas mixture is transported through the material for a period of time sufficient to surface coat the material. The material such as the material comprising cellulose may have different size as described elsewhere herein when being subjected to the gas phase grafting. If the material e.g. the material comprising cellulose is of a small size e.g. chips or powder of straw or of a non-organic origin, the gas phase of acylation reagent, silylation reagent and/or alkylation reagent can be directed past the surface of the material or transported through the chips or powder by passing the gas through an amount of chips or powder particles each of which is to be surface coated with the respective acyl group, silyl group and/or alkyl group.

Preferred acylation reagents, silylation reagents and/or alkylation reagents or acylating agents, silylation agents and/or alkylating agents are mentioned elsewhere herein. The terms "acylation reagent" and "acylating agent" are use interchangeable herein. Also "silylation reagent" and "silylation agent" are use interchangeable as are "acylation reagent" and "acylating agent".

Further parameters of the gas phase grafting technique are described below especially in the section "gas phase grafting".

In one aspect the invention relates to a method for coating hydroxylated surfaces of a material with at least one compound from the groups of acylation, silylation and/or alkylation reagents to provide esters, silyl or alkyl ethers at the surface, said method comprising the steps of
  a) providing a material with a hydroxylated surface,
  b) providing at least one reagent selected from an acylation reagent, a silylation reagent and/or an alkylation reagent, wherein the acylation reagent is selected from the group of compounds of the formula

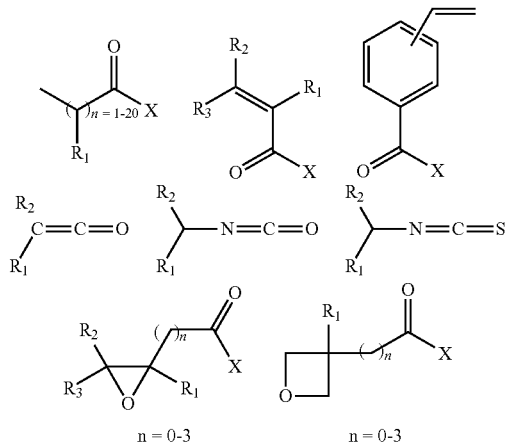

wherein X is selected from the group consisting of
  a halogen,
  OTf,
  OMs,
  Mixed carbonic anhydride,
  Mixed anhydride,
  imidazolium
wherein $R_{1(acy)}$, $R_{2(acy)}$ and $R_{3(acy)}$ are selected from H, aryl, alkyl and alkenyl groups with a molecular weight of less than 150,
wherein the alkylation reagent are selected from the group of compounds of the formula

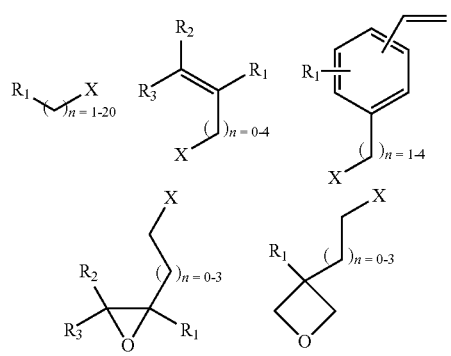

wherein X is selected from the group consisting of
  halogens,
  Sulfonates including Tf and Ms, and
  $OCOR_4$
where $R_4$ is a lower alkyl, fluoroalkyl or alkenyl group and
wherein $R_{1(alk)}$, $R_{2(alk)}$ and $R_{3(alk)}$ are selected from H, alkyl, aryl, fluoroalkyl, and alkenyl groups with a molecular weight of less than 150,
wherein the silylation reagent is selected from the group of compounds of the formula

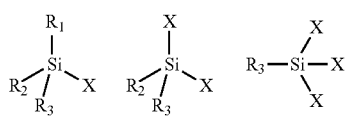

wherein X is selected from the group consisting of
Halogens
$OSO_2R_4$,
$NR_4R_4$, and
$OR_4$
where $R_4$ is H or a lower alkyl, fluoroalkyl or alkenyl group and
wherein $R_{1(sil)}$, $R_{2(sil)}$ and $R_{3(sil)}$ are selected from H, phenyl, alkyl, and alkenyl groups with a molecular weight of less than 150, c) contacting said material with a hydroxylated surface with at least one of said reagents selected from an acylation reagent, a silylation reagent and/or an alkylation reagent wherein said reagent is kept in gas phase, and d) obtaining a material which at the surface comprises covalently —O-linked residues comprising an acyl group, a silyl group and/or an alkyl group.

Mixed carbonic anhydride may be $OCO_2R_4$ where $R_4$ is selected from the group consisting of lower alkyl, fluoroalkyl or alkenyl groups. Preferably $R_4$=alkyl or aryl. Mixed anhydride may be $OCOR_4$ where $R_4$ is selected from the group consisting of lower alkyl, fluoroalkyl or alkenyl groups. Preferably $R_4$=alkyl or aryl.

Sulfonates including Tf and Ms may be $OSO_2R_4$ where $R_4$ is selected from the group consisting of lower alkyl, fluoroalkyl or alkenyl group. Preferably with R=alkyl or aryl.

In a preferred embodiment the invention relates to a method for preparing a material e.g. a material comprising cellulose covalently —O-linked to at least one compound of an acyl group, a silyl group and/or an alkyl group, said method comprising the steps of a) providing a material e.g. a material or compound comprising cellulose b) providing at least one reagent selected from an acylation reagent, a silylation reagent and/or an alkylation reagent,
wherein the acylation reagent are selected from the group of compounds of the formula

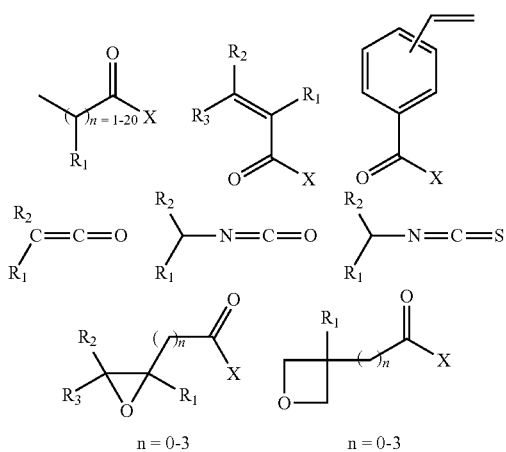

wherein X=F, Cl, Br, OTf (Trifluoromethylsulfonyl), OMs (Methylsulfonyl), $OCO_2R$, OCOR or imidazolium where R is small alkyl fluoroalkyl or alkenyl groups and wherein $R_1$, $R_2$ and $R_3$ are selected from H, aryl, alkyl and alkenyl groups of less than 150 Mw,
wherein the alkylation reagent are selected from the group of compounds of the formula

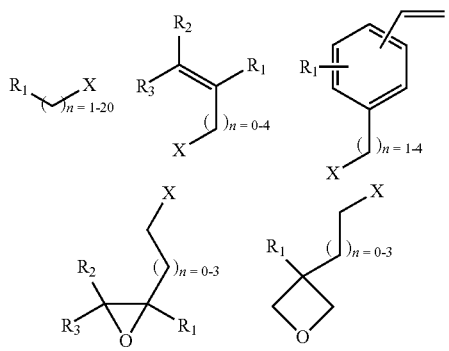

wherein X=Cl, Br, I, $OSO_2R$, OCOR where R is small alkyl fluoroalkyl or alkenyl groups and wherein $R_1$, $R_2$ and $R_3$ are selected from H, alkyl, aryl fluoroalkyl, and alkenyl groups of less than 150 Mw,
or
wherein the silylation reagent are selected from the group of compounds of the formula

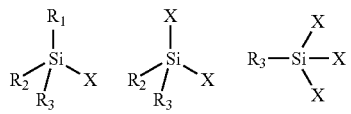

wherein X=Cl, Br, I, $OSO_2R$, NRR, OR where R is H or a small alkyl, fluoroalkyl or alkenyl groups and wherein $R_1$, $R_2$ and $R_3$ are selected from H, phenyl, alkyl, and alkenyl groups of less than 150 Mw, c) contacting said material e.g. material or compound comprising cellulose with at least one of said reagent selected from an acylation reagent, a silylation reagent and/or an alkylation reagent wherein said reagent is kept in gas phase, and d) obtaining a material e.g. a material comprising cellulose covalently —O-linked to at least one compound of an acyl group, a silyl group and/or an alkyl group.

The reaction is performed with the acylation reagent, the silylation reagent and/or the alkylation reagent in gas phase. The gas phase grafting is a dry process as it is not performed in solution.

Acylating Agent

Acylation reagent or acylating agents used in the grafting process described herein may be any suitable compounds. Preferred acylation reagents are selected from the group of compounds of the formula

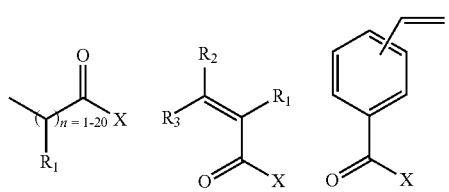

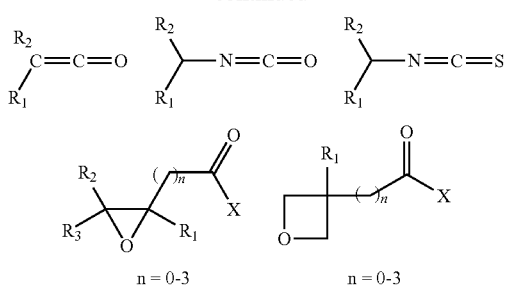

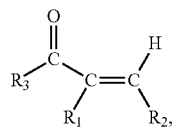

wherein X=F, Cl, Br, OTf (Trifluoromethylsulfonyl), OMs (Methylsulfonyl), $OCO_2R$, OCOR or imidazolium where R is small alkyl, fluoroalkyl or alkenyl groups and wherein $R_1$, $R_2$ and $R_3$ are selected from H, aryl, alkyl and alkenyl groups of less than 150 Mw.

In respect of the acylating reagents:

The alkyl groups may be selected from the group of methyl, ethyl, propyl, butyl, pentyl, hexyl.

The alkenyl groups may be selected from the group of vinyl, allyl, butenyl, pentenyl, hexenyl, butadienyl, pentadienyl, hexadienyl, 2-ethylhexenyl, 2-propyl-2-butenyl, and 4-(2-methyl-3-butene)-pentenyl.

Fluoroalkyl may be any of the alkyl groups mentioned above in which one or more fluorines have been substituted for hydrogen.

More preferred, the acylation reagent is selected from the group of

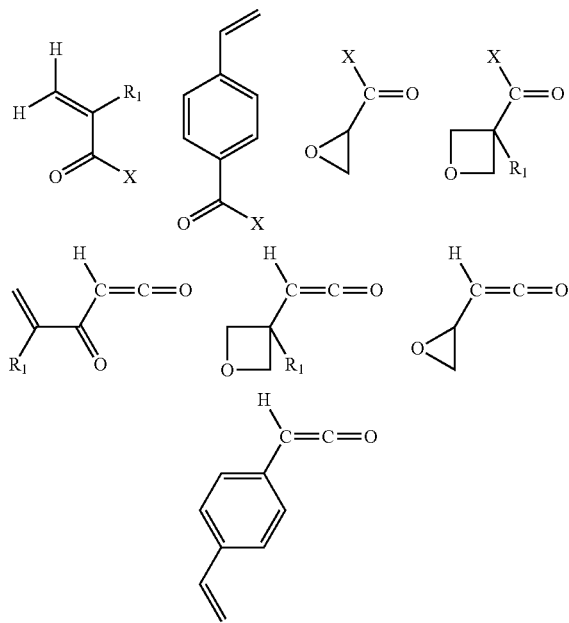

wherein X=F, Cl, or Br, and $R_1$=H, $CH_3$.

Preferably X=F or Cl, and $R_1$=H or $CH_3$. More preferably X=Cl and $R_1$=H. Also preferred is the reagent with the formula wherein $R_1$ and $R_2$ independently are selected from the group consisting of —H, lower alkyl, lower alcohols, lower alkoxy, lower ethers, lower alkenyl, halogen and lower alkyl substituted with halogen. Preferably, lower alkyl is $C_{1-6}$ alkyl, more preferably $C_{1-3}$ alkyl, even more preferably $C_{1-2}$ alkyl. The lower alkyl may be linear or branched, however preferably said lower alkyl is linear. Preferably, lower alcohol is $C_{1-6}$ alcohol, more preferably $C_{1-3}$ alcohol, even more preferably $C_{1-2}$ alcohol. Preferably, lower alkoxy is $C_{1-6}$ alkoxy, more preferably $C_{1-3}$ alkoxy, even more preferably $C_{1-2}$ alkoxy. Preferably, lower ether is $C_{1-6}$ ether, more preferably $C_{1-3}$ ether, even more preferably $C_{1-2}$ ether. The lower ether may comprise one or more —O—, preferably 1 or 2 —O—, even more preferably one —O—, wherein the —O— may be positioned at any position within the ether. Preferably, $R_1$ and $R_2$ are independently selected from the group consisting of —H and lower alkyl, more preferably from the group consisting of —H and $C_{1-6}$ alkyl, even more preferably from the group consisting of —H, methyl and ethyl. In a very preferred embodiment $R_1$ is methyl and $R_2$ is —H. $R_3$ may be selected from the group consisting of linear and branched alkyl, alkenyl, alkoxy, ethers, aliphatic ring optionally comprising heteroatoms, alcohols, halide, alkyl substituted with halogen and —H. Preferably, $R_3$ is halide or alkyl halide, more preferably halide, even more preferably chloride.

Alkylating Agent

Alkylation reagent or alkylating agents used in the grafting process described herein may be any suitable compounds. Preferred alkylation reagent are selected from the group of compounds of the formula

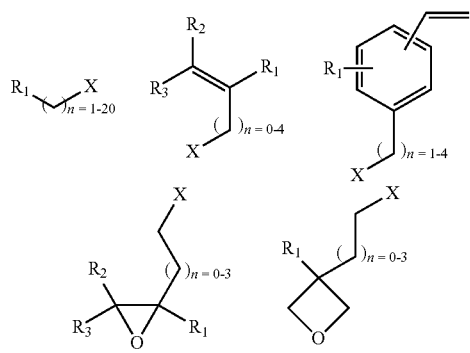

wherein X=Cl, Br, I, $OSO_2R$, OCOR where R is small alkyl, fluoroalkyl or alkenyl groups and wherein $R_1$, $R_2$ and $R_3$ are selected from H, alkyl, aryl fluoroalkyl, and alkenyl groups of less than 150 Mw, In respect of the alkylating reagents:

The alkyl groups may be selected from the group of methyl, ethyl, propyl, butyl, pentyl, hexyl.

The alkenyl groups may be selected from the group of vinyl, allyl, butenyl, pentenyl, hexenyl, butadienyl, pentadienyl, hexadienyl, 2-ethylhexenyl, 2-propyl-2-butenyl, and 4-(2-methyl-3-butene)-pentenyl.

Fluoroalkyl groups may be any of the alkyl groups mentioned above in which one or more fluorines have been substituted for hydrogen.

Aryl groups may be selected from the group of phenyl, benzyl, tolyl, and o-xylyl.

More preferred, the alkylation reagent is selected from the group of

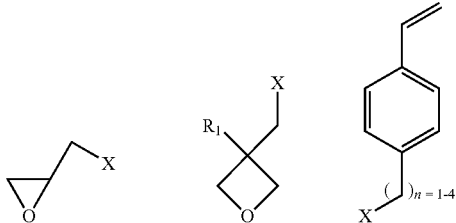

wherein X=F, Cl, or Br, and $R_1$=H, $CH_3$.

Preferably X=Cl or Br, and $R_1$=H or $CH_3$. More preferably X=Cl and $R_1$=H.

Silylating Agent

Silylation reagent or silylating agents used in the grafting process described herein may be any suitable compounds. Preferred silylation reagent are selected from the group of compounds of the formula

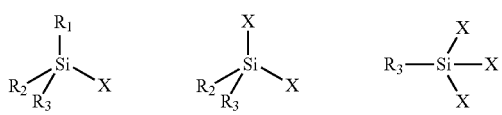

wherein X=Cl, Br, I, $OSO_2R$, NRR, OR where R is H or a small alkyl, fluoroalkyl or alkenyl groups and wherein $R_1$, $R_2$ and $R_3$ are selected from H, phenyl, alkyl, and alkenyl groups of less than 150 Mw, In respect of the silylating reagents:

The alkyl groups may be selected from the group of methyl, ethyl, propyl, butyl, pentyl, hexyl.

The alkenyl groups may be selected from the group of vinyl, allyl, butenyl, pentenyl, hexenyl, butadienyl, pentadienyl, hexadienyl, 2-ethylhexenyl, 2-propyl-2-butenyl, and 4-(2-methyl-3-butene)-pentenyl.

Fluoroalkyl groups may be any of the alkyl groups mentioned above in which one or more fluorines have been substituted for hydrogen.

Most Preferred Reagents

Further preferred reagents to be used in the surface coating process described herein are selected from the group of

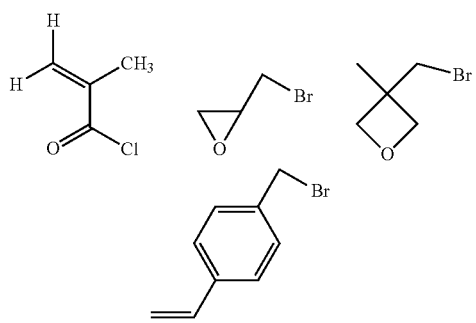

Although, the most preferred reagents used in the grafting process described herein are methacryloyl chloride ($C_4H_5ClO$) and acryloyl chloride ($C_3H_3ClO$). Both compounds are acylating reagents.

The preferred reagents have low boiling points, are highly reactive, are easy to buy and are cheaper than many of the other mentioned reagents.

Material to be Surface Treated

The present invention relates to a method for surface treating a material. The material may be any material preferably the material is with a hydroxylated surface. The material may be of inorganic or organic origin. The material may be an inorganic or organic polymer material of any form. Preferably the polymer material comprises cellulose. Such material is preferably of organic origin. Examples of inorganic material suitable to be surface treated according to the method described herein are glass fibers or silicas. Polymer materials of plant origin are preferred. Such material may originate from any part of the plant e.g. from roots, stems, leafs, flowers, fruits, seeds.

Preferably the surface of the material to be surface treated has a hydroxylated surface. A hydroxylated surface contains hydroxyl groups (—OH). Preferably the material has at least one hydroxyl group per square micrometer, such as at least 10 hydroxyl groups per square micrometer, e.g. at least 100 hydroxyl groups per square micrometer, such as at least 1,000 hydroxyl groups per square micrometer, e.g. at least 10,000 hydroxyl groups per square micrometer, such as at least 100,000 hydroxyl groups per square micrometer, e.g. at least 1,000,000 hydroxyl groups per square micrometer.

The surface of the material to be surface coated can be analysed by a surface hydroxyl density measurement. Hereby no hydroxyls/area unit is measured. The surface hydroxyl density measurement can be combined with a surface/weight measure to calculate hydroxyls/weight of a particular material.

For material which is to be surface treated and which comprises fibers, the units making up the linear chain of these units may comprise hydroxyl groups e.g. cellulose is a polysaccharide consisting of a linear chain of several hundred to over ten thousand β(1→4) linked D-glucose units. In a chain of units at least 10% of the units may contain at least one hydroxyl group, such as at least 30%, e.g. at least 50%, such as at least 70%, e.g at least 90%. Preferably at least 75% of the units contain at least one hydroxyl group. More preferably at least 85% of the units contain at least one hydroxyl group. Further preferably at least 95% of the units contain at least one hydroxyl group.

Each unit comprising at least one hydroxyl group, may comprises at least two hydroxyl groups, such as at least three hydroxyl groups, e.g. at least four hydroxyl groups.

In a preferred embodiment the material to be subjected to the surface coating comprises cellulose with three hydroxyl groups on each glucose unit.

The material to be surface coated may also comprise hemicellulose. Sugar monomers in hemicellulose can include xylose, mannose, galactose, rhamnose, and arabinose. Hemicelluloses contain most of the D-pentose sugars, and occasionally small amounts of L-sugars as well. When the material to be surface coated comprises hemicellulose, each unit of sugar in the hemicellulose chains preferably comprises two to four hydroxyl groups.

Also silica and glass may be subjected to the gas phase grafting process as described herein. Glass may be glass beads, controlled pore glas, glass slides. Hereby hydroxyl groups on silica and glass may be alkylated, acylated and/or silylated. Preferably hydroxyl groups on silica and glass may be silylated using the silylation reagents described above in a gas phase reaction. The silica can be in the form of amorph silica particles or shaped silica such as spheres. The glass can be in the form of beads, fibers (glass fibers) or controlled pore glass. Also larger chips of glass such as glass slides for e.g. microscopy or scanning purposes may be used.

Examples of other material which may be subjected to a surface process as described herein are cellulose acetates e.g. cellulose diacetate, cellophane, viscose. Cellophane made of cellulose acetates may be subjected to the surface grafting technique as sheets of cellophane or e.g. as rolls of cellophane. A rolls of cellophane can be grafted by a reel to reel grafting. With two rewind stands in a reaction vessel (which will be filled with reagent(s) described herein e.g. acylating agent(s) in gas form) the cellophane can be spooled from one reel to the other reel and the cellophane is subjected to the surface grafting process. Heating and cooling may be accomplished by contact to several temperature controlled rollers. Grafted cellophane preferably is weldable.

Preferred polymer material comprising cellulose can be obtained from the group of cotton, barley, wheat, rye, oat, rice, sorghum, maize, willow, rapeseed, abaca, bagasse, bamboo, banana, broom root, bantala, baroa, bhina jute, boir, buruaua, bate palm, blax, bemp, benequen, isora, istle, jute, linseed, kapok, kenaf, kudzu, kauritius hemp, nettle, oil palm, piassava, pineapple, phormium, roselle, ramie, sansevieria, sisal, sponge gourd, straw, sun hemp, cadillo/urena, wood, algae, seaweed.

Preferably the organic material surface treated according to the method described herein and used for purposes such as paper products, wrapping, bottling, construction etc, are plant material which is not suitable as human food. Examples of such materials may be straw/stem, leaf, leaflets, seed coats, shoots, trunks, roots, bark, mycelia etc.

Any form or dimension of the material e.g. polymer material may be surface treated according to the present invention. Preferred is treatment of material such as polymer material with dimensions such that the sum of the overall length, width and breadth is less than 15 cm, such as less than 10 cm, e.g. less than 5 cm, more preferably less than 1 cm. More preferred the material is a milled form of the material e.g. milled form of fibers (powder of fibers) in the size range of 0.1 micrometer to 5000 micrometer with an average particle size in the range 5-3000 micrometer, more preferred of 10-1000 micrometer. The average particle size of the material can also be 1-1000 micrometer, such as 1000-2000 micrometer, e.g. 2000-3000 micrometer, such as 3000-4000 micrometer, e.g. 4000-5000 micrometer. Preferably the average particle size is 1-4000 micrometer, more preferably 2-3000 micrometer, further preferably 5-2000 micrometer. The milling of the material can be performed with any type of mill but a PulseWave® mill is preferred because it protects the integrity of the cellulose fibers.

A dense polymer fiber material without cavities is preferred as the material to surface treat, however in reality plant cell wall material often have hollow cavities. The present invention facilitates the surface modification of such material even inside these cavities. Thereby even hollow fiber material can be thoroughly anchored in a composite polymer by e.g. radical- or ring opening polymerization reaction.

Preferred is polymer material which is chopped into small pieces, e.g. chips of about 300 micrometer.

Examples of material which is suitable to surface coat according to the present invention are straw from cereals, which are chopped into chips of a length of about 0.1 to 0.9 cm. The size distribution of the fiber material is determined by the source of the fibers in combination with the milling technique employed. The preferred milling is by PulseWave®. Barley straw that are passed through a PulseWave® mill present a size average of 400 micrometer with a distribution that range from 0.1 micrometer to 2000 micrometer with 95% of the material in the range 50-800 micrometer Plant parts from any plant mentioned elsewhere herein in respect of plant fiber may also be surface coated according to the present invention. Some of these plants are Abaca, Bagasse, Bamboo, Banana, Broom root, Cantala, Caroa, China jute, Coir, Cotton, Curaua, Date palm, Flax, Hemp, Henequen, Isora, Istle, Jute, Kapok, Kenaf, Kudzu, Mauritius hemp, Nettle, Oil palm, Piassava, Pineapple, Phormium, Roselle, Ramie, Sansevieria, Sisal, Sponge gourd, Cereals, Sun hemp, Cadillo/urena and Wood The polymer fiber material surface treated according to the invention described herein may be a combination of one or more plant fiber materials, such as one kind of plant fiber material, such as two different kinds of plant fiber material, for example 3 different kinds plant fiber material, for example 4 different kinds of plant fiber material, such as 5 different kinds of plant fiber material, for example more than 5 different kinds of plant fiber material, such as in the range of 5 to 10 different kinds of plant fiber material, for example in the range of 10 to 20 different kinds of plant fiber material, such as more than 20 different kinds of plant fiber material. It is however preferred that the polymer material to be surface coated is a mixture comprising only in the range of 1 to 5 different plant fiber materials, more preferably only in the range of 1 to 2 different plant fiber materials, more preferably only one kind of plant fiber material.

Also surface coating fiber according to the method described herein is preferred. The fiber is preferably obtained from plants. Any plant producing fiber can be used. Plants producing strong plant fibers may give rise to a surface coated product with an extremely high strength. Some plants producing strong fibers are mentioned below. Depending on the nature of the plant various parts of the plant may be used as source of the plant fiber, for example the source of the plant fiber may be straw/stem, leaf, leaflets, seed coats, shoots, trunks, roots, bark, mycelia or fruits.

Preferably, if strong plant fiber is a request, the plant fiber can be obtained from a plant selected from the group consisting of cotton, linseed, seaweed, abaca, bagasse, bamboo, banana, broom root, bantala, baroa, bhina jute, boir, buruaua, bate palm, blax, bemp, benequen, isora, istle, jute, kapok, kenaf, kudzu, kauritius hemp, nettle, oil palm, piassava, pineapple, phormium, roselle, ramie, sansevieria, sisal, sponge gourd, straw, sun hemp, cadillo/urena, wood.

In a preferred embodiment, if strong plant fiber is a request, the plant fiber material may comprise fibers from one or more plants selected from the group consisting of Banana, Coir, Hemp, Pineapple, manilla and Sisal, more preferably Sisal.

Very preferably, if plant fibers are derived from any of the aforementioned plants, they are preferably derived from the part of the plants as indicated in Table 1 below.

TABLE 1

List of important biofibers

| Fiber source | Species | Origin |
|---|---|---|
| Abaca | *Musa textilis* | Leaf |
| Bagasse - | Grass | |
| Bamboo (>1250 species) | Grass | |
| Banana | *Musa indica* | Leaf |
| Broom root | *Muhlenbergia macroura* | Root |
| Cantala | *Agave cantala* | Leaf |
| Caroa | *Neoglaziovia variegate* | Leaf |
| China jute | *Abutilon theophrasti* | Stem |
| Coir | *Cocos nucifera* | Fruit |
| Cotton | *Gossypium* sp. | Seed |

TABLE 1-continued

List of important biofibers

| Fiber source | Species | Origin |
|---|---|---|
| Curaua | *Ananas erectifolius* | Leaf |
| Date palm | *Phoenix Dactylifera* | Leaf |
| Flax | *Linum usitatissimum* | Stem |
| Hemp | *Cannabis sativa* | Stem |
| Henequen | *Agave fourcroydes* | Leaf |
| Isora | *Helicteres isora* | Stem |
| Istle | *Samuela carnerosana* | Leaf |
| Jute | *Corchorus capsularis* | Stem |
| Kapok | *Ceiba pentranda* | Fruit |
| Kenaf | *Hibiscus cannabinus* | Stem |
| Kudzu | *Pueraria thunbergiana* | Stem |
| Mauritius hemp | *Furcraea gigantea* | Leaf |
| Nettle | *Urtica dioica* | Stem |
| Oil palm | *Elaeis guineensis* | Fruit |
| Piassava | *Attalea funifera* | Leaf |
| Pineapple | *Ananus comosus* | Leaf |
| Phormium | *Phormium tenas* | Leaf |
| Roselle | *Hibiscus sabdariffa* | Stem |
| Ramie | *Boehmeria nivea* | Stem |
| Sansevieria | (Bowstring hemp) *Sansevieria* | Leaf |
| Sisal | *Agave sisilana* | Leaf |
| Sponge gourd | *Luffa cylinderica* | Fruit |
| Straw (Cereal) | — | Stalk |
| Sun hemp | *Crorolaria juncea* | Stem |
| Cadillo/urena | *Urena lobata* | Stem |
| Wood | (>10,000 species) | Stem |

Plant fibers are commercially available from many sources. For example many plant fiber can be obtained from Randers REB international A/S, Denmark (for example Sisal (white), Code no: N26-0040-001N, Hemp (gray), Code no: N04-0060-000N and Manil. H (dark brown) Code no: N18-0060-001N).

In order to produce a strong material while being able to homogeneously distributing the fibers in the subsequent production of a polymer blend it is preferred that the fibers have an optimized ratio (aspect ratio) between fiber length and width. A preferred aspect ratio is in the range of 10-50 and more preferred 30. The length of the fiber particles is thereby controlled by the width. In a preferred embodiment the fiber width can be controlled as well by means of chemical, physical and enzymatic treatment of the fibers. Small fibers favor fiber entanglement and homogeneity of the final product while larger fibers add rigidity and strength to the polymers produced. In a preferred embodiment of the present invention strong sisal fibers of 2 mm average length, wood-paper pulp fibers of 1 mm average length and cotton fibers of 0.5 mm average length are derivatized with methacryloyl chloride in the gas phase using dry nitrogen or dry air as a carrier gas.

Chemical treatment of the natural fibers to be surface treated can also be favorable to release hydroxylated fiber surfaces that are often coated with various waxy substances in the plant material. Therefore a treatment with dilute 0.32% 80° C. hot sodium hydroxide followed by washing and drying of the fibers has a favorable influence on the degree of surface modification obtained by the present invention. Other means of pretreatment of the fibres is treatment with dilute mineral acids e.g. $H_2SO_4$ or HCl at elevated temperatures. The concentration of the acids may be 0.5-5%, preferably 1-4%, more preferably 1.5-3, most preferably about 2%. The temperature can be 65-95° C., preferably 70-90° C., more preferably 75-85° C., most preferably about 80° C. The treatment time can be 5-25 min, preferably 7-20 min, more preferably 8-15 min, most preferably about 10 min. The fibers can also be treated with enzymes e.g. lipases or cellulases to loosen or roughen the surface of the fiber material. The fibers can be treated with lipases produced from *Achromobacter, Alcaligenes, Arthrobacter, Bacillus, Burkholderia, Chromobacterium* and particularly *Pseudomonas* in order to remove waxy substance on the fibers. The fibers may be treated with a mixture of *Pseudomonas* produced lipase and cellulase complexes produced by *Trichoderma viride* grown on cellulose medium. A 1-5 h treatment with a mixture of lipase and the crude extract of *Trichoderma viride* followed by a washing of the fiber and heat treatment (prior to extended degradation of the fibers) produce fibers with more accessible surface hydroxyl groups.

The plant fiber may be prepared from longer plant fibers which are turned into fiber of the desired size by any useful means, for example by use of cutting means. A cutting mill is preferred as a means of sizing the fibers, but sizing can also be obtained by grinding or other types of milling including PulseWave® milling. Manual cutting is also feasible using a knife, a blender, scissors or any other useful cutting means.

In general plant fibers comprise polymers and it is preferred that the plant fiber used with the present invention at least comprises cellulose, more preferably the plant fibers comprises cellulose and hemicellulose.

Material comprising cellulose may for example be derived from plants, such as finely divided plant fiber e.g. it may be cellulose composites. However, the material may also be purified cellulose, such as crystalline cellulose.

Cellulose is a polysaccharide consisting essentially of polymerized glucose monomer units, in general cellulose is a linear chain of D-glucose monomer units linked by $\beta$-(1→4) bonds. The cellulose polysaccharide preferably consists of in the range of 300 to 15,000, for example in the range of 500 to 10,000 glucose monomer units.

Gas Phase Grafting

As described above the invention relates to a method for preparing a material comprising cellulose fiber covalently —O-linked to at least one compound of an acyl group, a silyl group and/or an alkyl group, said method comprising the steps of a) providing a compound or material e.g. a material or compound comprising cellulose, b) providing at least one reagent selected from an acylation reagent, a silylation reagent and/or an alkylation reagent, c) contacting said compound or material e.g. material or compound comprising cellulose with at least one of said reagent selected from an acylation reagent, a silylation reagent and/or an alkylation reagent wherein said reagent is kept in gas phase, and d) obtaining a material comprising cellulose covalently —O-linked to at least one compound of an acyl group, a silyl group and/or an alkyl group.

The material e.g. the material comprising cellulose as well as the acylation reagent, silylation reagent and/or alkylation reagent can be as described elsewhere herein.

Reagents with comparable reactivity and boiling points can be used in concert to prepare fibers with composite surface modification. If for eksampel pentanoic acid chloride is mixed with methacryloyl chloride these reagents will evaporate concurrently and give a mixed but homogen derivatization of the surface presenting a reduced density or polymerization active methacrylates. Any other combination of acylation, alkylation and silylation reagents that can coexist without decomposition and that fulfill this requirement of similar volatility and reactivity towards hydroxyls may be used in concert.

Examples of combinations of reagents that are useful for gas phase derivatisation of cellulose fibers:

3-bromomethyl-3-methyl-oxetane and benzylbromide
Acryloyl chloride and propionyl chloride
Epichlorohydrin and cyclohexyl bromide
Methacryloyl chloride and ethyl chloroformate Methacryloyl chloride and allylbromide Examples of combinations of reagents that are useful for gas phase derivatisation of glass fibers:

4-Vinylbenzyl dimethyl chlorosilane and tri-butyl chlorosilane

Tert-butyl-diphenyl chlorosilane and tris-(3methyloxetanylmethyl) clorosilane

Preferably the material which should be surface coated, e.g. the material comprising cellulose, is in a solid state throughout the surface coating process.

To retain the reagents in the gas phase when directing them over or through the material e.g. the material comprising cellulose, the material is preferably pre-heated before initiating the grafting process. The temperature of the process container (fluid bed) may also be controlled and maintained throughout the grafting process. Preferably, the grafting process occurs at a temperature below 200° C., such below 175° C., e.g. below 150° C., such as below 125° C. Preferred intervals are 110-130° C., 130-150° C., 150-170° C. and 170-190° C. It is further preferred that the reaction takes place at a temperature in the range of 50 to 110° C., preferably in the range of 60 to 100° C., more preferably in the range of 70 to 90° C., even more preferably in the range of 75 to 85° C., yet more preferably in the range of 78 to 82° C., for example around 80° C., such as at 80° C., for example in the range of 50 to 100° C., such as in the range of 60 to 100° C. for example in the range of 70 to 100° C., such as in the range of 75 to 100° C. for example in the range of 50 to 90° C., such as in the range of 60 to 90° C., for example in the range of 75 to 90° C. In order for the reaction to take place at the aforementioned preferred temperatures, it is preferred that the compound/material optionally comprising cellulose is kept at said temperature. This may be achieved by any suitable method known to the skilled person for example by placing the compound/material optionally comprising cellulose (for example the plant fiber, plant chips or plant powder) in a water, oil or sand bath with the desired temperature, by heating the container containing the material with steam or by microwave heating.

The grafting process can be performed at various pressures in the range of 0.001 bar to 200 bar to increase volatility of the reagents at lower pressures or to increase the concentration of a volatile reagent at the site of reaction at higher pressures. In a preferred embodiment the process pressure is 0.5-2 bar. In a more preferred embodiment of the process the pressure is 1 bar.

In a preferred embodiment the combination of the groups $R_1$, $R_2$ and $R_3$ of the acylation reagents, silylation reagents and alkylation reagents as described herein does not contain more than 25, more preferred less than 10 such as five carbon atoms in total. The preferred boiling point of the reagent of interest at atmospheric pressure is below 200° C. Derivatization reagents such as fatty acid chlorides with low volatility can be brought into the gas phase by lowering the pressure of the reaction equipment. For example dodecanoic acid chloride may be transferred to and reacted in gas phase with fibers using a temperature of 150° C. and 5 mBar. The use of a recirculating carrier gas facilitate the evaporation of the reagent even below the boiling point of said reagent.

Preferably a homogeneous temperature is maintained throughout the reaction vessel (fluid bed) when the grafting process is performed.

If the grafting process is performed in vacuum the material e.g. the material comprising cellulose is preferably pretreated i.e. pre-dried at a temperature and vacuum at which the grafting process is to be performed. Performing the grafting process in vacuum may be preferred as this reduces or eliminates any risk of explosion of dust. Dust may be present if the material comprising cellulose is chopped or cut into smaller pieces e.g. plant chips before the grafting is performed.

If the material which should be surface coated has a small size, the material is preferably stirred or agitated when the grafting process is performed. The gas stream of the reagent through the bed of the material should preferably not be laminar. A turbulent flow of gas is preferred.

The rate of forward reaction can be increased by passing reactant gas and dry air occasionally to drive out the HCl gas byproduct if HCl is produced. Reactant gas can be passed through the material to be surfaced coated for e.g. 3 minutes followed by 2 minutes of a flow of dry air or nitrogen to remove the HCl gas and to push the reaction forward. The interval of 3 min of reactant gas and 2 min of a non-reactant gas can be repeated throughout the reaction time. The used times can also be 2 min of reactant gas and 1 min of a non-reactant gas, 2 min of reactant gas and 2 min of a non-reactant gas, 3 min of reactant gas and 1 min of a non-reactant gas, 3 min of reactant gas and 3 min of a non-reactant gas.

In a preferred embodiment a carrier gas is used to circulate the acylation reagent, the silylation reagent and/or the alkylation reagent which is in gas phase which is brought in contact with the material which is to be surface treated. Preferred carrier gases are selected from group of helium, neon, argon, nitrogen, hydrogen, oxygen, air, chlorine, trimethylamin, dimethylamine methylamine, dimethyl ether, carbon monoxide, carbon dioxide, carbondisulfide, sulfurdioxide, hydrogen Sulfide, hydrogenchloride, nitric oxide, nitrogen dioxide, alkanes ($C_xH_{2x+2}$), fluoroalkanes, isobutane, ethene, propylene, butane, butadiene, cyclopropane, cyclobutane, ethyleneoxide, Isobutylene, acetone acetylene, propyne, methylchloride.

Liquids such as water, triethylamine, pyridine, carbon tetrachloride etc. may be gasified and used as carrier gasses at temperatures above their boiling points.

The preferred gasses are the nobel gasses, nitrogen, air, carbon dioxide, carbon disulfide and alkanes. Most preferred is nitrogen or carbon dioxide due to the low cost and inertness of these gases.

Reaction between the hydroxylated surface and the reagent(s) in gas phase may lead to release of the component X in the formulas shown elsewhere herein. When X is halogen, such as Cl then HX e.g. HCl may be a product produced when the material is surface coated. If undesirable product(s) are generated, the process may comprise a step of removing the produced product.

If HCl is produced when the reagents react with the surface of the material, this HCl can be trapped e.g. by zeolite. The zeolite can be regenerated. Other leaving groups may also be removed from the gas phase. If formed HBr can be removed with 4 Å molecular sieves. Organic acids and sulphonic acids may be trapped with proton sponge or trialkylamino resins.

In a preferred embodiment temperature control is performed of all the reagents, carrier gasses and starting material (material to be surface coated) as well as the produced product (surface coated material). Preferably the temperature of the reagent(s) in gas phase, the carrier gasses and the starting material is uniform. A similar temperature is maintained throughout the surface coating process. Temperature controlling means can thus be connected to the container for the starting material, to the reaction vessel (may be the same as the container for the starting material), to a container for surface treated material (if present), to the vessel for heating the reagent(s) and to the vessel for the carrier gas as well as to the tubes connecting the described units (containers and vessels). Preferred temperatures are described elsewhere herein.

In another preferred embodiment pressure control is performed of all the reagents, carrier gasses and starting material (material to be surface coated) as less preferred to the produced product (surface coated material). Preferably the pressure of the reagent(s) in gas phase, the carrier gasses and the starting material is uniform. A similar pressure may be maintained throughout the surface coating process. The pressure may also be varied e.g. oscillated between high and low pressure to increase the contact of reagents with irregular surfaces. Pressure controlling means can thus be connected to the container for the starting material, to the reaction vessel (may be the same as the container for the starting material), to a container for surface treated material (if present), to the vessel for heating the reagent(s) and to the vessel for the carrier gas as well as to the tubes connecting the described units (containers and vessels). The pressure is controlled in respect of a desirable temperature and concentration of the reagent(s). Preferred pressures are described elsewhere herein.

In a further preferred embodiment gas flow rate control is performed when the reagents in gas phase optionally together with a carrier gas is directed through the reaction vessel containing the material that should be surface coated. Means for gas flow rate control can thus be connected to the container for the starting material, to the reaction vessel (may be the same as the container for the starting material), to a container for surface treated material (if present), to the vessel for heating the reagent(s) and to the vessel for the carrier gas as well as to the tubes connecting the described units (containers and vessels). The gas flow rate is preferably regulated to minimize the influence of diffusion of surface reaction rate i.e. to ensure an excess of reagent at the surface at all times throughout the reactor. The preferred gas flow can also be lower in order to control development of hot spots due to heat of reaction. The preferred rate of gas is in case of a fluid bed reactor equivalent to the flow that provides the optimal fluidization without bumping of the material. The preferred flow rate therefore depends on the physical nature of the material to be derivatised. A typical linear flow rate is in the range of 10 cm/min to 50,000 cm/min such as 30 cm/min to 10,000 cm/min, e.g. 100 to 2,000 cm/min, such as 300 cm/min to 1,000 cm/min e.g. about 600 cm/min.

In yet a further preferred embodiment a control of feeding rate for reagents are performed and optionally also of the material to be surface coated. The feeding rate of the material to treat can be ⅒ to ½₀ of the amount of the material in the reactor (reaction vessel)/min. Preferably the feeding rate of the material to treat can be ½₀ to ¼₀ of the amount of the material in the reactor (reaction vessel)/min. More preferably the feeding rate of the material to treat is about ⅓₀ of the amount of the material in the reactor/min in order to produce an average residence time of 30 min. The product is removed at the same rate.

Preferably the feeding rate of the reagent(s) are (1-1000 mmol/liter of reaction volume)/min with an average particle size of 100-800 micrometer. More preferably the feeding rate of the reagent(s) are (1-100 mmol/liter of reaction volume)/min with an average particle size of 300 micrometer.

Means for controlling the feeding rate of the reagent(s) are thus connected to the reaction vessel and to the vessel for heating the reagent(s). Optionally means for controlling the feeding rate of the material to treat is connected to the container for the starting material, to the reaction vessel (may be the same as the container for the starting material), and to a container for surface treated material (if present).

The treatment time i.e. the time reactant(s) in gas phase is directed over the surface of a material can be e.g. in the range of 0.1 to 50 hours, preferably in the range of 0.3 to 25 hours, more preferably in the range of 0.5 to 15 hours, even more preferably in the range of 1 to 10 hours, yet more preferably in the range of 1 to 4 hours, even more preferably for approximately 1 to 2 hours, such as for 1 hour.

However, the reaction times may also be 1 min to 50 hours, preferably in the range of 2 min to 25 hours, more preferably in the range of 3 min to 15 hours, even more preferably in the range of 4 min to 10 hours, yet more preferably in the range of 5 min to 7 hours, even more preferably for approximately 6 hours, such as for 6 hours.

In another preferred embodiment excess of reagent are required at all times when the reagent(s) in gas phase are directed over the surface of the material to surface coat. By "excess of reagent" is meant that the amount of reagent(s) in gas phase when the gas has passed by the material in the reaction vessel or when the gas phase leaves the reaction vessel at least some reagent(s) are in the gas leaving the reaction vessel. Measuring means to measure the concentration of reagent(s) in the gas phase can thus be connected to the gas inlet and gas outlet of the reaction vessel, to the vessel for heating the reagent(s) and/or to an aggregate combining the heated reagent(s) with the carrier gas.

In a preferred embodiment, the surface coating is undertaken as a gas phase reaction, wherein the material comprising cellulose and/or plant fiber is provided in solid state and a compound of the formula

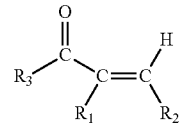

is provided in gas phase. $R_1$ and $R_2$ are independently selected from the group consisting of $C_{1-6}$ alkyl and —H preferably from the group of —H, lower alkyl, lower alcohols, lower alkoxy, lower ethers, lower alkenyl, halogen and lower alkyl substituted with halogen, and $R_3$ may be selected from the group consisting of linear and branched alkyl, alkenyl, alkoxy, ethers, aliphatic ring optionally comprising heteroatoms, alcohols, halide, alkyl substituted with halogen and —H. Preferably, $R_3$ is halide or alkyl halide, more preferably halide, even more preferably chloride.

More preferably $R_3$ is selected from such groups that constitute or contain leaving groups i.e. halides, alkyl sulfonates, haloalkylsulfonates, azides, mixed anhydrides, alkenylhalides, alkylhalides, arylhalides, N-methylimidazole. Preferably, $R_3$ is halide more preferably chloride.

Thus, the method preferably comprising the steps of
a) providing a compound comprising cellulose
b) providing a compound of the formula

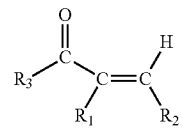

wherein R$_1$, R$_2$ and R$_3$ are as defined herein just above in the present section;

c) contacting said compound comprising cellulose with said compound of the formula

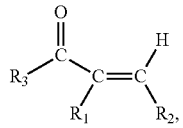

wherein said compound is kept in gas phase.

The compound comprising cellulose may be any material mentioned herein. The compound comprising cellulose may also be a plant fiber in which case the method results in a plant fiber material.

Preferably the compound comprising cellulose (for example the plant fiber and/or the plant material chips) is kept in the solid state.

With the reaction described just above where

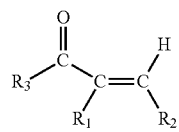

is grafted to a compound/material comprising cellulose, it is preferred that the reaction takes place at a temperature in the range of 50 to 110° C., preferably in the range of 60 to 100° C., more preferably in the range of 70 to 90° C., even more preferably in the range of 75 to 85° C., yet more preferably in the range of 78 to 82° C., for example around 80° C., such as at 80° C., for example in the range of 50 to 100° C., such as in the range of 60 to 100° C. for example in the range of 70 to 100° C., such as in the range of 75 to 100° C. for example in the range of 50 to 90° C., such as in the range of 60 to 90° C., for example in the range of 75 to 90° C. In order for the reaction to take place at the aforementioned preferred temperatures, it is preferred that the compound/material comprising cellulose fiber is kept at said temperature. This may be achieved by any suitable method known to the skilled person for example by placing the compound/material comprising cellulose (for example the plant material chips or powder and/or the plant fiber) in a sand bath with the desired temperature.

The acylation reagent, silylation reagent and/or alkylation reagent or the compound of formula

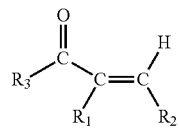

may be kept in gas phase by any suitable method known to the skilled person. For example the compound may be subjected to heating, for example the acylation reagent, silylation reagent and/or alkylation reagent or the compound of formula

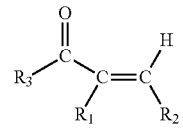

may be kept at a temperature of in the range of 40 to 100° C., such as in the range of 50 to 100° C., for example in the range of 55 to 100° C., such as in the range of 40 to 90° C., for example in the range of 50 to 90° C., such as in the range of 55 to 90° C., for example in the range of 40 to 80° C., such as in the range of 50 to 80° C., for example in the range of 55 to 80° C., such as in the range of 40 to 70° C., preferably in the range of 50 to 70° C., more preferably in the range of 55 to 70° C., for example in the range of 40 to 65° C., such as in the range of 50 to 65° C., yet more preferably in the range of 55 to 65° C., even more preferably in the range of 58 to 62° C., yet more preferably around 60° C., such as at 60° C.

The compound/material comprising cellulose should be contacted with the acylation reagent, silylation reagent and/or alkylation reagent or the compound of formula

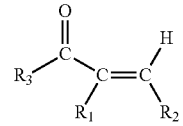

for sufficient time to allow the reaction to occur, preferably the compound/material comprising cellulose is contacted with the acylation reagent, silylation reagent and/or alkylation reagent or the compound of formula

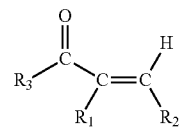

for in the range of 0.1 to 50 hours, preferably in the range of 0.3 to 25 hours, more preferably in the range of 0.5 to 15 hours, even more preferably in the range of 1 to 10 hours, yet more preferably in the range of 1 to 4 hours, even more preferably for approximately 1 to 2 hours, such as for 1 hour.

Although the reaction described just above may also be performed for in the range of 1 to 50 hours, preferably in the range of 2 to 25 hours, more preferably in the range of 3 to 15 hours, even more preferably in the range of 4 to 10 hours, yet more preferably in the range of 5 to 7 hours, even more preferably for approximately 6 hours, such as for 6 hours.

In addition, in order to contact the compound/material comprising cellulose with the acylation reagent, silylation reagent and/or alkylation reagent or the compound of formula

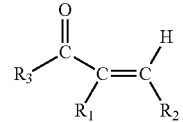

in gas phase it may be useful to employ a carrier gas, which preferably is an inert gas, more preferably a noble gas, for example argon.

A non-limiting example of a useful method for covalently linking a compound comprising cellulose to a compound of formula

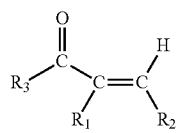

in gas phase is described in Example 3 herein below. The skilled person will appreciate that in the example the compound comprising cellulose is microcrystalline cellulose, however, the method may equally well be performed using any other of the plant material chips or powder described herein above in the section "Plant material chips or powder" or any of the plant fibers described herein above in the section "Plant fiber". Similarly, the skilled person will appreciate that in the example the compound of formula

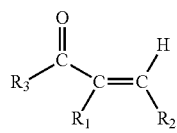

is methacryloyl chloride, however, the method may equally well be performed using any other of the compounds of formula

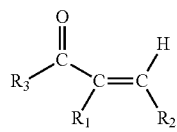

described herein above in this section.

A preferred non-limiting example of a method of linking a moiety of formula

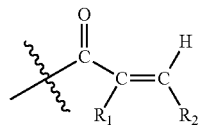

to a plant material chips or powder and/or plant fiber is given in Example 1.

The degree of —O-linking is herein used to denote to what extend a compound comprising cellulose is covalently linked to acyl, silyl and/or alkyl moieties as described elsewhere herein. Preferably, the degree of —O-linking is determined by a fluorescence based method, wherein double bonds are allowed to react with a free thiol group on a fluorescent dye. Difference of fluorescence between the material before reaction with the reagent(s) in gas phase and the fluorescence of the material comprising covalently —O-linked acyl, silyl and/or alkyl moieties is then used as a measure of the degree of —O-linking.

Preferably, the fluorescence of the material covalently —O-linked to acyl, silyl and/or alkyl groups upon reaction with said fluorescent thiol is 1-5 times higher such as at least 1.2 times higher, e.g. at least 1.3 times higher, such as at least 1.4 times higher e.g. at least 1.5 times higher, more preferably at least 1.8 times higher, even more preferably at least 2.5 time higher, yet more preferably at least 3.5 times higher, such as in the range of 1 to 5 times higher e.g. in the range of 1.4 to 3 times higher than the fluorescence of the material (blank) before reaction with the reagent(s) as described herein above but also exposed to said fluorescent thiol.

Preferably, the degree of —O-linking is herein used to denote to what extend a compound comprising cellulose is covalently linked to a moiety of formula

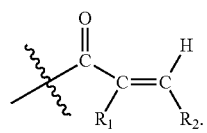

Preferably, the degree of —O-linking is determined by a fluorescence based method, wherein double bonds are allowed to react with a free thiol group on a fluorescent dye. Difference of fluorescence between the compound comprising cellulose (for example plant material chips or powder and/or plant fiber) before reaction with the compound of formula

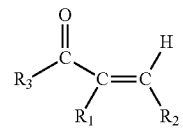

and the fluorescence of the compound comprising cellulose covalently —O-linked to

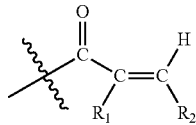

(for example the plant material chips or powder material or the plant fiber material) is then used as a measure of the degree of —O-linking.

Preferably, the fluorescence of the compound comprising cellulose covalently —O-linked to

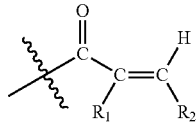

(for example the plant material chips or powder material or the plant fiber material) upon reaction with said fluorescent thiol is 1-5 times higher such as at least 1.2 times higher, e.g. at least 1.3 times higher, such as at least 1.4 times higher e.g at least 1.5 times higher, more preferably at least 1.8 times higher, even more preferably at least 2.5 time higher, yet more preferably at least 3.5 times higher, such as in the range of 1 to 5 times higher e.g. in the range of 1.4 to 3 times higher than the fluorescence of the compound (blank) comprising cellulose (for example plant material chips or powder and/or plant fiber) before reaction with the compound of formula

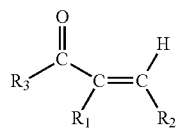

but also exposed to said fluorescent thiol.

Preferably, the fluorescent dye may be any fluorescent dye comprising a thiol group, but in a preferred method the fluorescent dye is a cys-reactive rhodamine, preferably RMA1118-69.

The material e.g. plant fiber material to be used with the present invention preferably has a minimal degree of —O-linking. Thus it is preferred that the material e.g. fiber material such as plant fiber material surface coated according to the gas phase grafting technique described herein has a fluorescence, which is at least 1.2 times higher, more preferably at least 1.3 times higher, even more preferably at least 1.4 time higher, yet more preferably at least 1.5 times higher, for example in the range of 1.2 to 10 times higher, such as in the range of 1.3 to 10 times higher, for example in the range of 1.4 to 10 times higher, such as in the range of 1.5 to 10 times higher, for example in the range of 1.2 to 5 times higher, such as in the range of 1.3 to 5 times higher, for example in the range of 1.4 to 5 times higher, such as in the range of 1.5 to 5 times higher, for example in the range of 1.2 to 3 times higher, such as in the range of 1.3 to 3 times higher, for example in the range of 1.4 to 3 times higher, such as in the range of 1.5 to 3 times higher, for example in the range of 1.2 to 2 times higher, such as in the range of 1.3 to 2 times higher, for example in the range of 1.4 to 2 times higher, such as in the range of 1.5 to 2 times higher, most preferably in the range of 1.5 to 1.75 times higher than fluorescence of the material e.g. fiber material such as a plant fiber, which is not linked to acyl, silyl and/or alkyl moieties when determined by fluorescens labelling analysis. The material e.g. fiber material such as a plant fiber, which has not been reacted with a reagent(s) as described elsewhere herein, may also be referred to as material standard e.g. fiber material standard such as a plant fiber standard in the context. The material standard e.g. fiber material standard such as a plant fiber standard is preferably of the same structure as the material e.g. fiber material such as a plant fiber material except that the material e.g. fiber material such as a plant fiber standard lacks surface coating applied by the gas phase grafting technique as described herein.

Properties of the Surface Coated Material

The density of hydroxyls on the cellulose surface has been estimated to be $2*10^{16}$ hydroxyl groups/cm$^2$. The degree of derivatisation would thus be expected to be corresponding to any value less than that and converted to percentage.

Preferably the surface of the material to be surface treated has a hydroxylated surface. Some or all of the hydroxyl groups (—OH) present at the material before performing the gas phase grafting may be subjected to the grafting process where a group of the reagent (grafted group) is connected to the surface of the material. Preferably the surface coated material has at least one grafted group per square micrometer, such as at least 100 grafted groups, for example 1000 grafted groups per square micrometer, e.g. at least 10,000 grafted groups per square micrometer, such as at least 100,000 grafted groups per square micrometer, e.g. at least 1,000,000 grafted groups per square micrometer, such as at least 10,000,000 grafted groups per square micrometer, e.g. at least 100,000,000 grafted groups per square micrometer.

For surface coated material comprises fibers, the units making up the linear chain of these units may comprise grafted groups. In a chain of units at least 10% of the units may contain at least one grafted group, such as at least 30%, e.g. at least 50%, such as at least 70%, e.g at least 90%. Preferably at least 75% of the units contain at least one grafted group. More preferably at least 85% of the units contain at least one grafted group. Further preferably at least 95% of the units contain at least one grafted group. Each unit comprising at least one grafted group, may comprises at least two grafted groups, such as at least three grafted groups, e.g. at least four grafted groups.

In a preferred embodiment the surface coating material comprises cellulose with three grafted groups on each glucose unit.

The surface coating material may also comprise hemicellulose. In such material each unit of sugar in the hemicellulose chains preferably comprises two to four surface grafted groups.

When the material which is surface coated according to the present invention is obtained from an organic origin, the material e.g. polymer material surface coated according to the invention is in general biodegradable. In one embodiment it is thus preferred that the material such as polymer material according to the invention is biodegradable as determined by at least one of the methods, preferably two or more of the methods described herein below. However, surface coated material coated by the gas phase grafting technique described herein may also be of non-organic origin. In such cases the material is not biodegradable.

One useful method for determining biodegradability is incubation of the material e.g. polymer material with a fresh sample of sewage sludge for a predetermined period of time. The $CO_2$ recovery is determined and compared to the theoretically possible $CO_2$. One example of such a method is described herein below in Example 5a. It is preferred that the material e.g. polymer material of organic origin surface coated according to the invention is biodegradable as determined by the test for biodegradability as described in Example 5a, and thus when subjecting the polymer material of the invention to the test of Example 5a then preferably at least at least 30%, more preferably at least 40%, even more preferably at least 50%, yet more preferably at least 60% of the theoretically possible $CO_2$ is recovered after 30 days of incubation.

Another useful method for determining biodegradability is incubation of the material e.g. polymer material with a mixture of sand, soil and compost matrix for a predetermined period of time. The $CO_2$ recovery is determined and compared to the theoretically possible $CO_2$. One example of such a method is described herein below in Example 5b. It is preferred that the material e.g. polymer material surface coated according to the invention is biodegradable as determined by the test for biodegradability as described in Example 5b, and thus when subjecting the polymer material of the invention to the test of Example 5b then preferably at least at least 30%, more preferably at least 40%, even more preferably at least 50%, yet more preferably at least 60% of the theoretically possible $CO_2$ is recovered after 60 days of incubation.

A preferred test method for determining biodegradability is incubation of the material e.g. polymer material with an inoculum that is derived from compost from municipal solid waste. The inoculum is preferably a sample of compost from municipal solid waste. The material such as polymer material is preferably incubated with the inoculum for a predetermined amount of time, preferably for 45 days. The $CO_2$ recovery is determined and compared to the theoretically possible $CO_2$. One example of such a method is described herein below in Example 5c. It is preferred that the material e.g. polymer material surface coated according to the invention is biodegradable as determined by the test for biodegradability as described in Example 5c. Thus when subjecting the material such as polymer material of the invention to the test of Example 5c then the recovery rate of $CO_2$ (i.e. % $CO_2$ recovered of total possible) is preferably at least at least 30%, more preferably at least 40%, even more preferably at least 50%, yet more preferably at least 60%, even more preferably at least 70%, yet more preferably at least 80% of the recovery rate of $CO_2$ of the positive control, wherein the positive control is selected from the group consisting of cellulose, starch, oak, maple, corn leaves and craft paper.

When containers prepared from the surface coated material e.g. surface coated polymer material, are used for storage of liquids or the surface coated material is used as food package, it is preferred that the surface coated material e.g. polymer material only has a limited water intake when soaked in water. Preferably, the water intake (herein also referred to as the water swelling) is at the most 30%, even more preferably at the most 20%, yet more preferably at the most 10%, even more preferably at the most 5%.

Depending on the use of the surface coated material, it may be preferred that the tensile strength of the polymer material is high. Using above described surface coated material e.g. surface coated plant fiber material and plant material may lead to material e.g. polymer materials with useful tensile strength. Thus, preferably, the tensile strength of the material e.g. polymer material is at least 10 MPa, more preferably at least 20 MPa, even more preferably at least 25 MPa, for example at least 27 MPa, such as at least 29 MPa, for example in the range of 10 to 200 MPa, more preferably in the range of 20 to 200 MPa, even more preferably in the range of 25 to 100 MPa, for example in the range of 28 to 100 MPa, such as in the range of 29 to 100 MPa when determined using Hounsfield Test Equipment.

Furthermore, it is preferred that the storage modulus E' of the surface coated material is sufficiently high. Preferably, the storage modulus E' is at least 2500, more preferably at least 3000, for example at least 3200, such as at least 3300, for example at least 3400 at a temperature of in the range of −40° C. to −30° C., preferably in the range of −37° C. to −32° C.

Use of the Surface Coated Material

The surface coated material e.g. surface coated polymer material according to the present invention is useful for a number of different applications. One preferred use of a polymer material is as a container for liquids. Another preferred use is for food packaging, especially for food, which need a water-proof packaging. A further preferred use is for paper products, especially products where the paper products need to be water repellent or water-proof.

Preferred articles produced from material surface coated according to the gas phase grafting technique described herein are car parts and interiors, crates and boxing materials, construction materials such as beams, boards, tiles, surface coatings, consumer items such as cabinets, parts for electronic equipment, furniture, lamp parts, computer casing, boat construction, pavement, piping, airplane parts, kitchenware.

The above items are constructed from the surface modified particles by a radical or a ring opening polymerization under high pressure in a mould, in presence of 20-50% of a monomer polymerizing under the similar conditions. Radical polymerization may be initiated under oxygen free conditions with a radical initiator such as AlBN/bis ammonium persulfate or by a bust of UV-light. Ring opening can be initiated by acid (oxetanes) or alkoxide (oxiranes).

The surface coated material described herein can be formed into a product by different forming techniques such as forming it in a mould, by thermoforming, by injection moulding, compression moulding, extrusion moulding, blow moulding. With an average particle size of 300 micrometer of the surface treated material the compression moulding is preferred.

Two or more materials surface coated as described herein may be mixed and formed into a product. These could comprise a small particle fraction and a strong fiber fraction derived from any of the fiber sources mentioned above, this is the preferred mixture. It could also be a mixture of a cellulose material and a glass fiber, in fact any combination of material carrying similar polymerizable functional groups may be mixed with the equivalent monomer and polymerization initiated to form a polymer under pressure.

One or more materials surface coated as described herein may be mixed with a non-coated material e.g. a plastic and formed into a product. Examples of materials that could be blended into the polymer is any of the fibers mentioned above prior to derivatisation or an elastomer granulate that may modify the plasticity of the product.

In an embodiment a material, which is surface coated according to the gas phase grafting described herein, is mixed with polystyrene and injection moulded into an item. This item may be car parts and interiors, crates and boxing materials, construction materials such as beams, boards, tiles, surface coatings, consumer items such as cabinets, parts for electronic equipment, furniture, lamp parts, computer casing, boat construction, pavement, piping, airplane parts, kitchenware.

When the polymer material should be used as a container e.g. for liquids, the material e.g. polymer material is preferably prepared using a mould of a suitable shape for such containers. Suitable shapes for containers e.g. containers for liquid includes for example various bottle shapes, cubic shapes, cylindrical shapes and boxes, preferably, the container for liquid is a bottle. It is preferred that the entire container e.g. the bottle itself is prepared entirely of the surface coated material e.g. surface coated polymer material of the invention, however, any closure means (such as a lid or a cap, for example a crown cap) may be prepared from another material, for example metal (such as aluminium or iron) and/or plastic.

Liquid or soft products which can be stored in a container produced from a surface coated material as described herein may be any liquid or soft products. Examples of liquids and soft products are food related liquids and soft products e.g. beverages such as soft drinks, milk, beer; bacterium based products such as cheese, yoghurt. However, in one preferred embodiment of the invention the surface coated material e.g polymer material is used as a container for beverages, in particular, the surface coated material such as polymer material may be used as a container for carbonated beverages, such as carbonated soft drinks or beer. In this embodiment it is of particular importance that the polymer material has the preferred strength described herein above.

In one embodiment of the invention, surface coated material may be used for preparing food storage materials. Preferably food storage materials are produced from surface coated material of organic origin e.g. plant polymer material. Preferably the food storage materials may be selected from the group consisting of crates, cans, boxes, glass substitutes and table utensils. Preferably said glass substitutes are disposable glass substitutes. Thus the invention in one embodiment relates to table utensils comprising or preferably consisting of a surface coated material e.g. a polymer material according to the invention. Preferably, said table utensils are disposable table utensils, which due to the biodegradable nature of the polymer material would then preferably also be biodegradable. The table utensils may for example be cutlery, such as spoon, forks or knifes or it may be plates or cups or polymer-glasses.

In an embodiment the surface coated material is used to produce water-repellant or water-proof paper products. These paper products may be paper used for writing, news papers, magazines, books etc. However, the paper products may also be solid board, white lined chipboard, corrugated board, as well as other types of paper products thicker that plain paper for writing. Paper products comprising material(s) surface coated by the gas phase grafting technique described herein may be produced from surface coated fibre e.g. surface coated pulp (dry fibrous material). The fibre and pulp may be virgin or from recycled paper.

Items produced from material(s) surface coated by the gas phase grafting technique described herein can be used instead of traditionally paper storage containers e.g. cardboard boxes, however, boxes produced from material(s) surface coated by the gas phase grafting technique described herein is water-repellant or water-proof and can be used instead of wooden boxes. Especially in areas (regions and types of industry) where traditional cardboard boxes are not suitable due to the water absorbent feature of these boxes, boxes produced from material(s) surface coated by the gas phase grafting technique described herein may be suitable due to the water-repellant or water-proof feature.

A paper product can be produced from straw e.g. of cereals. The straw can optionally be soaked in solution before being cut into smaller pieces e.g. grinded to a powder. The small pieces (e.g. powder) of the straw may contain lignin, remaining soil particles, remaining part of insects etc. The grinded straw material can be surface coated as described herein. The surface coating process is performed under conditions which sterilize the grinded straw material. The surface coated straw material can be used for the production of water resistant or water proof paper. This paper has a high strength and is biodegradable. When compared to traditional processes for the production of paper, the method as described herein uses much less water and much less energy. Furthermore the traditional processes for the production of paper decompose as much cellulose as possible by boiling and removes the lignin before drying the pulp.

Items produced from a surface material coated by the gas phase grafting technique described herein can have a strength such the product can replace plastic in a lot of items. Examples are car parts and interiors, crates and boxing materials, construction materials such as beams, boards, tiles, surface coatings, consumer items such as cabinets, parts for electronic equipment, furnitures, lamp parts, computer casing, boat construction, pavement, piping, airplane parts, kitchenware.

System

In an aspect the invention relates to a system for surface coating a material as described herein the system comprises
A reaction vessel,
A vessel for the reagent(s),
A vessel for carrier gas,
Tubes and pipes for connecting the reaction vessel, the vessel for heating the reagent(s), and the vessel for carrier gas,
Temperature controlling means,
Pressure controlling means, and
Means for gas flow rate control.

The reaction vessel contains the material when this material is surface coated by the described gas phase grafting process. The material can enter the reaction vessel as a batch (non-continuously) before the grafting process is initiated or as a continuously supply while the gas phase grafting process occurs. The gas phase grafting process takes place when the gaseous reagent(s) described herein are directed over the surface of the material. The reaction vessel can be controlled in respect of the temperature (by temperature controlling means for reaction vessel) inside the reaction vessel. The temperature inside the reaction vessel may be controlled before the material enters the reaction vessel as well as in the period when the material is located inside of the reaction vessel. The temperature controlling means may be activated such that the material is heated while the materiel enters the reaction vessel as well as when the material is in the reaction vessel, but before the gas phase grafting process is initiated i.e. before gaseous reagent(s) are directed to the reaction vessel. This is a pre-heating of the material. Pre-heating of the material before directing reagent(s) into the reaction vessel is preferred to keep the reagent(s) in gas phase. The temperature controlling means of the reaction vessel is capable of heating and cooling the inside of the reaction vessel. The temperature of the reaction vessel can be controlled in the range of 0-350° C., preferably 10-300° C., more preferably 20-250° C., further preferably 30-200° C. Preferred temperatures when performing the surfacing coating is described elsewhere herein in respect of the temperatures of the gas phase grafting process.

In an embodiment pressure controlling means is connected to the reaction vessel. The pressure of the reaction vessel can be controlled before the material enters the reaction vessel as well as in the period when the material is located inside of the reaction vessel. The pressure controlling means may be activated when the material is in the reaction vessel (batch or continuously supply), but before the gas phase grafting process is initiated i.e. before gaseous reagent(s) are directed to the reaction vessel. This is a pressure (negative pressure (vacuum) or positive pressure) pre-treatment of the material and can be performed together with the pre-heating described elsewhere. Pressure pre-treatment together with pre-heating of the material before directing reagent(s) into the reaction vessel may improve the coating process when the reagent(s) in gas phase at a later time are directed over the surface of the material. The pressure controlling means of the reaction vessel is capable of creating negative pressure (vacuum) and positive pressure inside of the reaction vessel.

The pressure controlling means of the reaction vessel can control the pressure of the reaction vessel in the range of 1-100,000 mbar. Preferably is a pressure of 100-10,000 mbar such as 300-3,000 mbar e. g. 800-1,500 mbar such as 1,013 mbar.

An example of the grafting process may be evacuation of the heated reactor (reaction vessel) containing the solid/ material to be derivatised, then charging the reactor with reagent and carrier gas mixture in order to fill up all cavities in the material with reagent. Then the pressure may be increased to e. g. 5,000 mbar to increase the concentration of reagent at the surface and thereby reaction rate.

Preferred negative pressure used when performing the surfacing coating is described elsewhere herein and is preferably 1-200 mbar. Negative pressure is established with standard evacuation pumps.

In a further embodiment means for gas flow rate control is connected to the reaction vessel. The gas flow rate control controls the gas flow rate of the reagent(s) and/or of the carrier gas(ses) when these are directed through the reaction vessel. The gas flow rate can be controlled to increase or decrease the time the gasses of reagent(s) and carrier gas (ses) are located within the reaction vessel. The gas flow rate may be dependent of the amount of material to subject to the surface coating process. The gas flow rate may also be adjusted in respect of the amount of surface coating located on the material subjected to the surface coating treatment.

The system further comprises a vessel for the reagent(s). The reagent when located in the vessel may initially be solid, liquid or gaseous e.g. the reagent under atmospheric pressure and room temperature can be supplied to the vessel for the reagent(s) as a solid, liquid or gas. The vessel for the reagent(s) may comprise one chamber in total or a chamber for feeding reagent(s) to the vessel for reagent(s) and a chamber for pre-treatment of the reagent(s) before directing the reagent(s) as a gas to the reaction vessel. In a chamber for pre-treatment of the reagent(s) (which may be the same chamber as the one for feeding reagent(s) to the vessel) the reagents may be heated and/or subjected to negative or positive pressure. The pre-treatment of the reagent(s) i.e. bringing the reagent(s) into gas phase if being a solid or liquid at room temperature, may also be performed in the tubes and pipes connecting the vessel for the reagent(s) and the reaction vessel. Furthermore carrier gas can be entered into the vessel for the reagent(s) or mixed with the pretreated reagent(s) in the tubes and pipes before the mixture enters the reaction vessel.

In another embodiment the system comprises a vessel for carrier gas. The carrier gas may be an inert gas, preferably nitrogen and/or argon. The carrier gas can also be oxygen. The carrier gas acts as a carrier that facilitate evaporation and maintenance of the reactant in the vapor phase and may furthermore have effects comparable to those known for solvents in liquid phase reactions, e. i. complexing and assisting the substitution reactions taking place.

The vessel for carrier gas can be connected to the vessel for reagent(s) and/or to the tubes/pipes directing the reagent(s) in gas phase from the vessel for reagent(s) to the reaction vessel. To the vessel for carrier gas a means for controlling the amount of carrier gas is connected. This means for controlling the amount of carrier gas directs an amount of carrier gas from the vessel for carrier gas and through the system towards the vessel for reagent(s) and/or the reaction vessel. The amount of carrier gas may be adjusted when the gas phase grafting reaction is performed.

Tubes and pipes are used for connecting the at least the reaction vessel, the vessel for heating the reagent(s), and the vessel for carrier gas. Also tubes and pipes may be a part of the system to connect other units of the system. These connections are shown in the figures and/or are described below. The description may only be such that material or gas is directed from one unit to another unit without explicitly describing the tubes and pipes.

Temperature controlling means may be connected to the reaction vessel, to the vessel for reagent(s), to the vessel for carrier gas, and/or to the tubes/pipes such that the temperatures of these units may be independently controlled and adjusted if necessary.

Means for directing gas through the system may be connected to the reaction vessel, to the vessel for reagent(s), to the vessel for carrier gas, and/or to the tubes/pipes such that an optimal combination of reagent(s) in gas phase and carrier gas can be directed through the reaction vessel where a material is surface coated.

Temperature, pressure, amount of reagent(s) in gas phase and amount of carrier gas can be independently adjusted by the means described herein to obtain suitable conditions for the surface reaction in the reaction vessel.

In an embodiment the system as described above further comprises
  Heating means,
  Container for the starting material,
  A container for surface treated material,
  A container for trapping HCl,
  Pumps for pumping the gas phase of reagents and carrier gas and/or
  A cooler to cool surface treated material and/or to cool gas leaving the reaction vessel.

Heating means and cooling means may be an integrated part of the means for controlling the temperature as described above. Heating means can be used as described above in respect of means for controlling the temperature. Heating means can be used to heat the reaction vessel in a system where material which should be subjected to the surface coating process continuously is directed through the reaction vessel. The material which should be surface coated is feed into one end of the reaction vessel and leaves the other end of the reaction vessel. The reagent(s) in gas phase can be directed into and out of the reaction vessel with a similar direction as the flow of the material which is being subjected to the surface treating process. The reagent(s) can also have a flow direction opposite the flow direction of the material in the reaction vessel. When the material and the gas have a similar flow direction through the reaction vessel, heating means can heat the reaction vessel in the end where the material enters the reaction vessel. Cooling means can cool the reaction vessel in the end where the material leaves the reaction vessel. The material may be re-directed into the reaction vessel a number of times to perform further surface coating of the material. Preferably the material enters the reaction vessel in the bottom and leaves the vessel in the top. Preferably the material and the gas have a similar flow direction through the reaction vessel.

In an embodiment the system comprises a container for the starting material. This container is preferably for material not yet surface coated according to the process described herein. The container for the starting material is preferably connected to the reaction vessel such that material to treat can be directed from the container for the starting material to the reaction vessel. Temperature controlling means and pressure controlling means may be connected to the container for the starting material to make it possible to pre-treat the material before it enters the reaction vessel. A pre-treatment of the material in the container for the starting material at a temperature and pressure similar to the temperature and pressure which is used in the reaction vessel may be beneficial for the surface coating of the material.

The system may also comprise a container for surface treated material. Material which has been subjected to the gas phase grafting process in the reaction vessel is directed to the container for surface treated material. From this container the material may be re-directed to the reaction vessel or the material may leave the system as surface coated material. Surface controlling means may be connected to the container for surface treated material to determine whether the material has a required surface coating and can leave the system or the material has to be re-directed to the reaction vessel again. The surface controlling means may be based on an automated fluorescent measurement of the material, as the surface coated material may have a different fluorescent emission than the uncoated material.

Material and gasses (reagent(s), carrier gas and gas produced in the reaction vessel, if this is produced) leaving the reaction vessel can be separated by means for separating solid materials and gasses. Such a means for separating solid materials and gasses may be a cyclone. The gas may be cleaned for any gases produced in the reaction vessel. Also the content of the gaseous reagent(s) and the carrier gas may be controlled and adjusted. Hereby the combination of carrier gas and gaseous reagent(s) is ready to be directed into the reaction vessel again.

The reagent(s) used in the gas phase grafting may contain a —Cl group. Hereby HCl (hydrogen chloride) can be produced in the reaction vessel when the reagent(s) with the —Cl group react with the hydroxylated surface of the material. HCl will be directed out of the reaction vessel together with the remaining gaseous reagent(s) (reagent not reacted with hydroxylated parts of the material surface) and the carrier gas. A container for trapping HCl or other gases produced in the reaction vessel can be connected to the reaction vessel and/or to the means for separating solid materials and gasses. A container for trapping HCl (HCl capture column or Zeolite trap for HCl) may contain zeolite to capture the HCl.

In an embodiment the system comprises pumps for pumping the gas phase of reagents and carrier gas through the system. Such pumps may be located at different positions of the system. Examples of locations are at the tubes or pipes located before the gas phase enters the reaction vessel and/or located after the gas phase has left the reaction vessel.

Valves may also be present in the system for gas phase grafting materials. The valves may be located at the inlet and/or outlet of any unit of the system as described herein. Preferably valves are used in connection to the means for controlling the amount of gaseous reagent(s) in the system, the amount of carrier gas in the system, to control material entering and leaving the system.

The system may also comprise a cooler to cool surface treated material and/or to cool gas leaving the reaction vessel. The cooler may be a heat exchanger. The heat obtained when cooling the surface treated material and/or the gas leaving the reaction vessel can be used to heat the material and/or gas before these enters the reaction vessel and/or while these are in the reaction vessel.

In a further embodiment the system further comprises
  Stirring means for stirring the material when performing the coating process,
  Recirculating means for recirculating the material to surface coat,
  Feeding means to feed the reaction vessel with untreated (uncoated) material.

Stirring means for stirring the material when performing the coating process may be located inside of the reaction vessel. The stirring of the material reduces the risk of different temperature in the reaction vessel, and it secures a turbulent of gas flow through the reaction vessel. If further reactions occur in the reaction e.g. a microwave treatment as described elsewhere herein, the stirring means may secure a more uniform treatment of the material in the reaction vessel. The stirring means may by any stirring equipment e.g. circulating shovels. The stirring means can also be a snail transporting the material through the reaction vessel. The direction in which the snail transports the material may be horizontal or vertical. If being vertical the material may be transported downwards or upwards. Openings or holes in the stirring means e.g. through the shovels may ensure contact between the gaseous reactant(s) and the surfaces of the material in the reaction vessel. The gaseous reactant(s) and carrier gas may also be directed through the inside of the stirring means and into the reaction vessel through holes or apertures in the stirring means e.g. through holes or apertures in the snail.

As mentioned above recirculating means for recirculating the material may be located to direct material from the reaction vessel back to the reaction vessel to obtain another round of gas phase grafting of the surface or the material. Recirculation of material in the system may result in material with a more uniform coated surface than if no recirculation is performed.

In an embodiment the system comprises feeding means to feed the reaction vessel with untreated (uncoated) material. The feeding means may be in communication with the recirculation means for recirculating the material, such that the amount of material in the reaction vessel is the same over time. Hereby the amount of material which is not recirculated by the recirculating means (i.e. the amount which exits the system) is feed into the reaction vessel by the feeding means to feed the reaction vessel.

In a further embodiment the system comprises means for emitting micro waves in the reaction vessel. The means for emitting micro waves may be one or more magnetrons.

In a preferred embodiment the reaction vessel is a fluidized bed. Preferably the material enters the reaction vessel in the bottom of the vessel and the material leaves the reaction vessel in the top of the vessel. Further preferably the gas flow direction is also from the bottom to the top of the reaction vessel.

In another preferred embodiment the material enters the reaction vessel in the top of the vessel and the material leaves the reaction vessel at the bottom of the vessel. The material can also enters the reaction vessel through an inlet in the top part of the vessel, and the material can leave the reaction vessel through an outlet located at any position below the inlet. Hereby both the inlet and outlet can be located in the top part of the vessel. Preferably the gas flow in these type of systems is opposite of the overall direction of the material in the reaction vessel i.e. the gas flow direction is from the bottom towards the top of the reaction vessel.

DETAILED DESCRIPTION OF THE DRAWINGS

FIG. 1 shows a schematic representation of a methacryloylation reaction performed in liquid or in gas phase. A schematic representation of the reaction performed in solution is shown in FIG. 1a. A schematic representation of the corresponding reaction performed in gas phase is shown in FIG. 1b. In the examples a reaction between cellulose and methacryloyl chloride is shown, however a similar reaction may take place using plant fiber comprising cellulose. A similar reaction can be performed with other compounds similar to methacryloyl chloride such as the compounds described herein.

FIG. 2 shows a schematic representation of a polymerisation of surface treated materials leading to a polymer material comprising different sizes of surface treated materials. In this example plant fiber (which also could be other types of materials) is represented by ovals which are methacryloylated, and the plant material chips or powder material is methacryloylated cellulose. 3 different monomers are used, which in this example are ethylmethacrylate, ethylacrylate and acrylic acid. In this example a cross-linker is added, namely the cross-linker Aldrich 24,684-0. As free radical initiators, TEMED, ammonium persulphate, lauroylperoxide and 2,2'-azobis(2-methylpropionamidine)dihydrochloride are used. The plant fibers (ovals) and the cellulose fibre can be surface treated by the gas phase grafting technique as described elsewhere herein.

Figure 3:
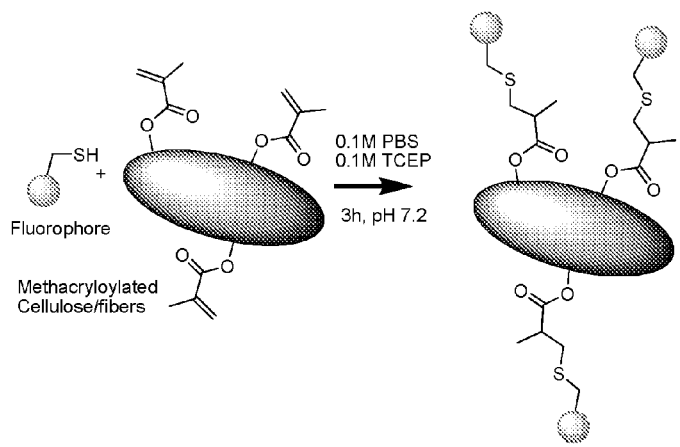
FIG. 3 shows a schematic representation of a reaction between a fluorophore comprising a thiol group and methacryloyl cellulose/fiber.

FIG. 3 shows a schematic representation of a reaction between a fluorophore comprising a thiol group and methacryloyl cellulose/plant fiber/plant material chips or powder, wherein the cellulose/plant fiber/plant material chips or powder is depicted as an oval. The reaction leads to a covalent bound between the cellulose/plant fiber/plant material chips or powder and the fluorophore by Michael reaction of a thiol with the methacrylates on the surface.

Figure 4:
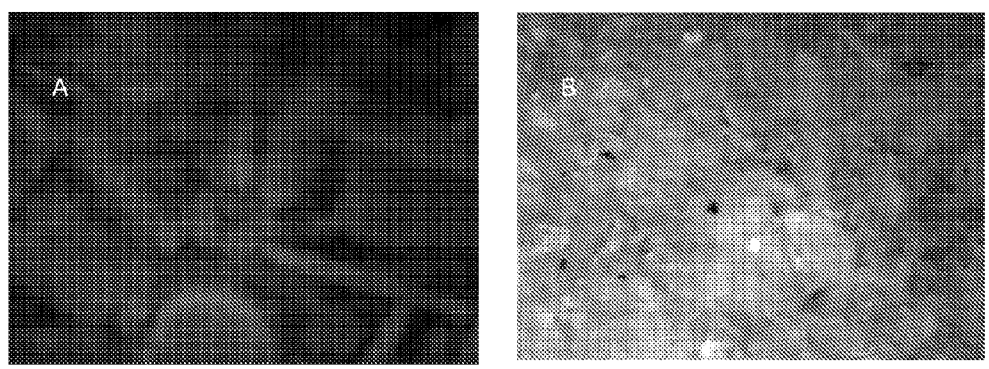
FIG. 4 shows an example of a picture of barley straw reacted with RMA-1118-69 (left) and a picture of methacryolated barley straw reacted with RMA-1118-69.

FIG. 4 shows an example of a picture of barley straw reacted with RMA-1118-69 (left) and a picture of methacroylated barley straw reacted with RMA-1118-69. A) Barley Straw before i.e. without methacryloylation had an Intensity of 193. B) Barley Straw after methacryloylation had an Intensity of 364. The fluorescence can thus be used to test whether the material has been subjected to a surface treatment. In this example the methacryolylation was performed by a liquid reaction.

Figure 5:
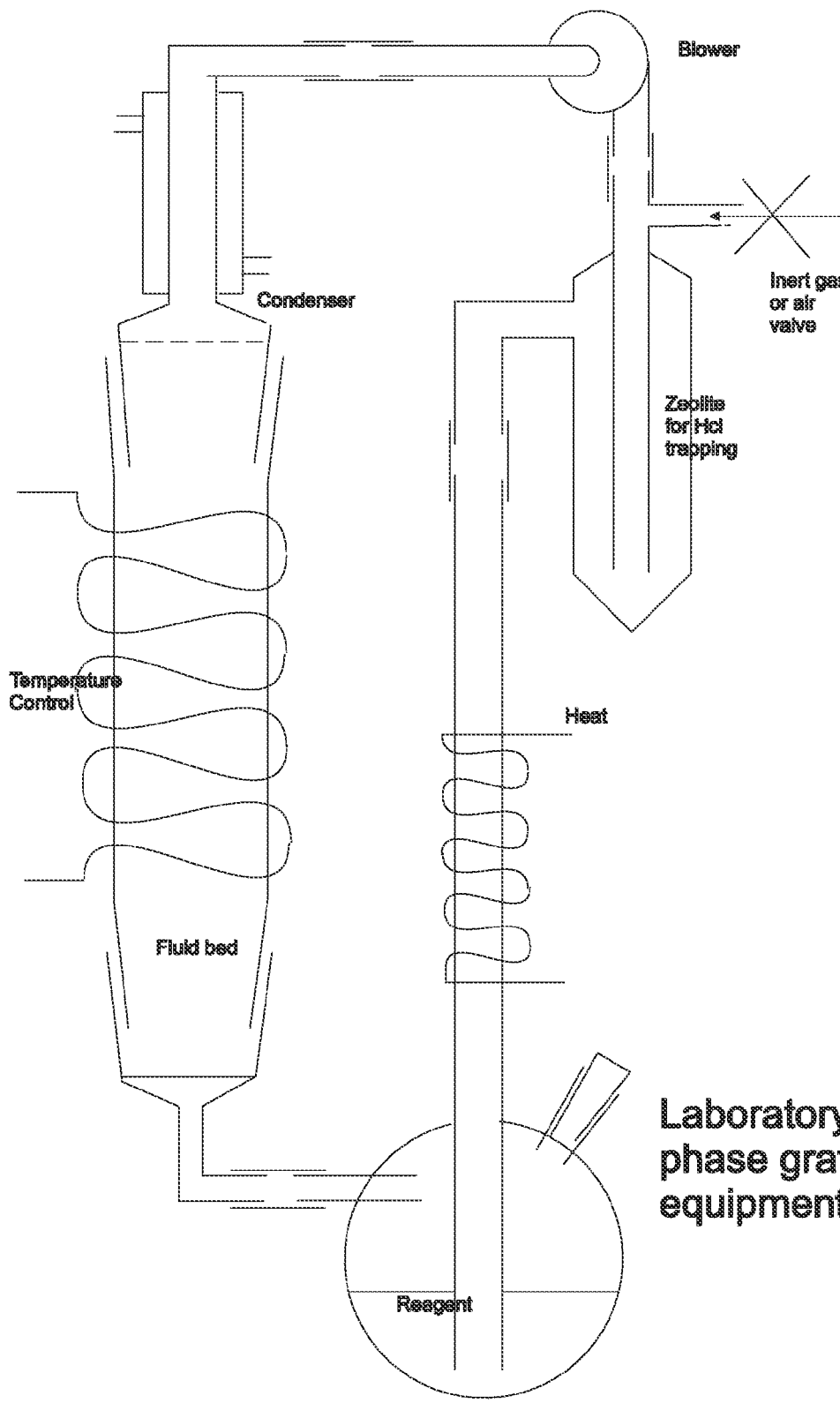
FIG. 5 shows a gas phase grafting equipment.

FIG. 5 shows a laboratory gas phase grafting equipment. The principle of the system also applies to a production system of any size. The material to be subjected to the surface coating process is located in the fluid bed while a reagent in gas phase is directed through the fluid bed from below. The temperature of the reagent as well as of the fluid bed is controlled. If HCl is developed due to the linking of the compound to the surface of the material, this HCl can be trapped by zeolite. Gas/reagent can continuously be directed through the fluid bed. The vertical glass reactor is equipped with quickfit joints at top and bottom to which glass fritted connectors are attached. The top of the column is connected through a cooler to a small recirculation blower. Via a 3 Å molecular sieve trap for HCl the unused reagents are recirculated with the heated carrier gas and bobbled through the gently heated stock solution of reagent.

Figure 6:
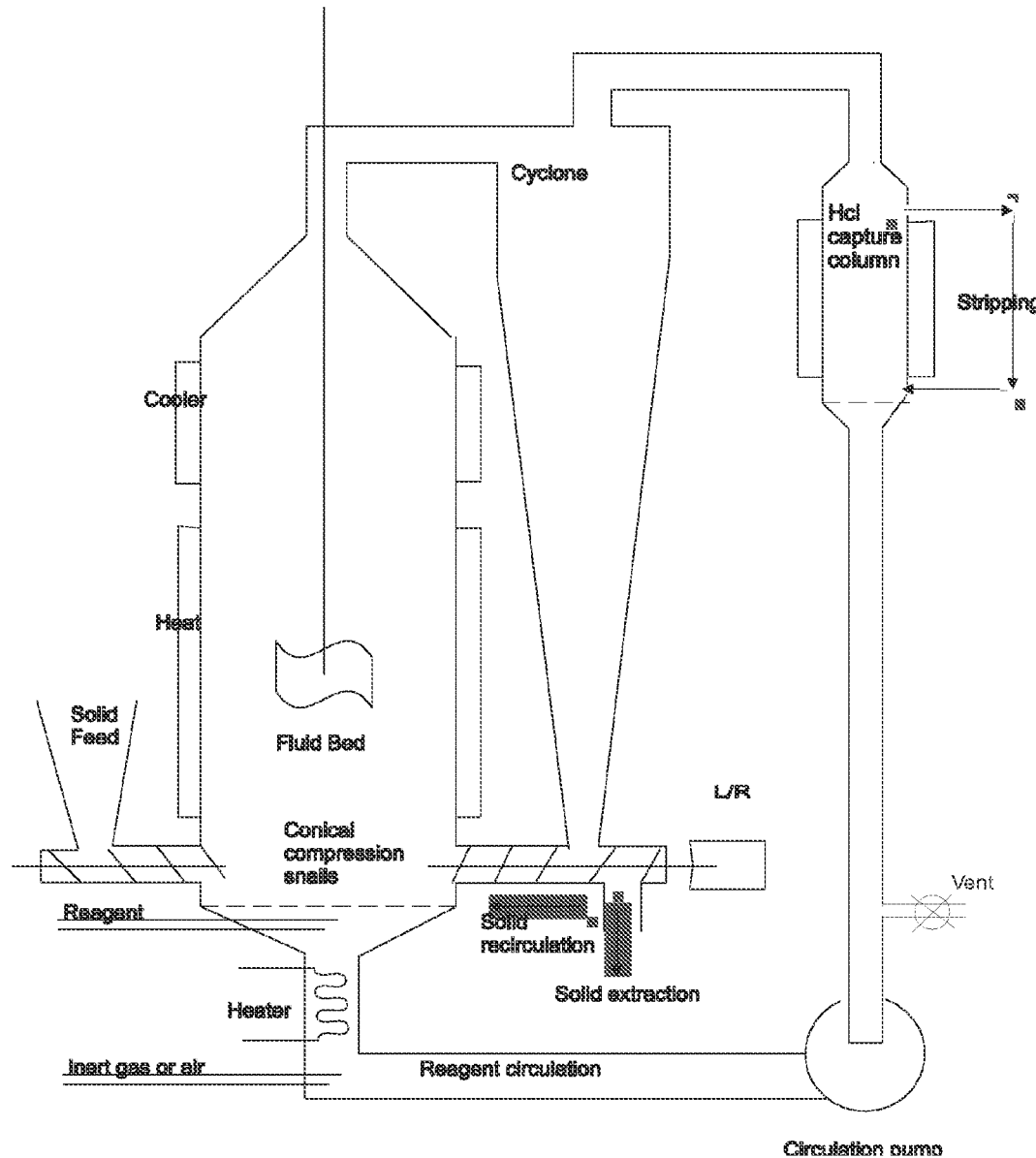
FIG. 6 shows a continuous gas phase grafting plant.

FIG. 6 shows a continous gas phase grafting plant. The material to surface coat is located in the fluid bed while a reagent in gas phase is directed through the fluid bed from below. The temperature of the reagent as well as of the fluid bed is controlled. If HCl is developed due to the linking of the compound to the surface of the material, this HCl can be trapped by zeolite. Gas/reagent can continuously be directed through the fluid bed. The material to surface coat can be fed to the plant through the "Solid Feed", and can be removed from the fluid bed in the top where it enters the cyclone and can be either re-circulated to the fluid bed or can be removed as a solid extraction. The material in the fluid may be agitated. The vertical stainless steel reactor is composed by standard chemical engineering using well proven unit operations. It comprises a fluid bed reactor of at least 2 m height with a bottom feed and recirculation of fiber. Solids are separated from the recirculation carrier gas and reagents using a cyclone and brought to a snail that may remove product or re-circulate fibers as needed. From the cyclone the HCl is carried to the zeolite HCl-capture column and unused reagent is re-circulated.

Figure 7:
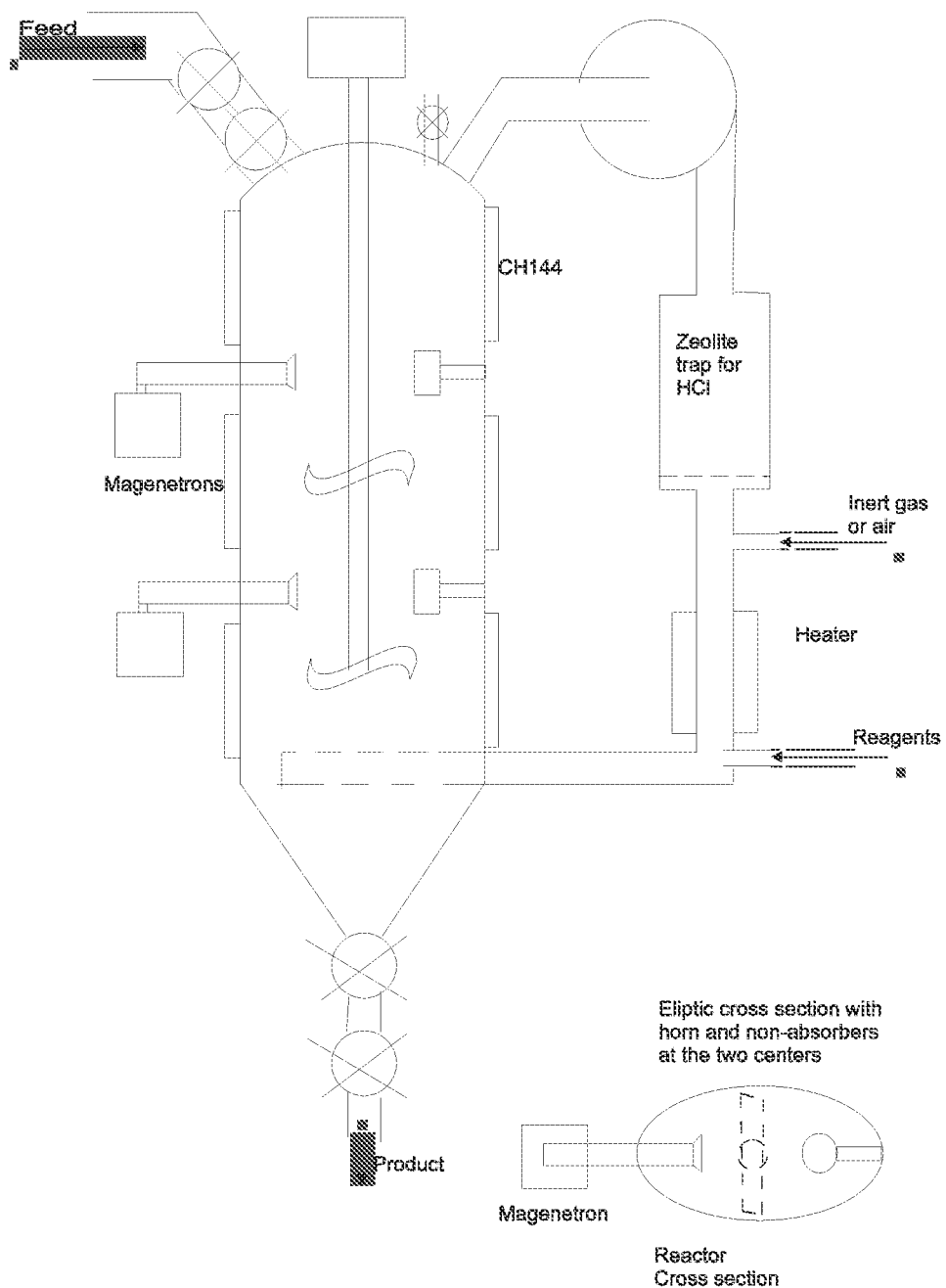
FIG. 7 shows a microwave assisted grafting system.

FIG. 7 shows a microwave assisted grafting system. The material to be surface coated is located in the fluid bed while a reagent in gas phase is directed through the fluid bed from below. The temperature of the reagent as well as of the fluid bed is controlled. When HCl is produced during the reaction this can be trapped by zeolite. Gas/reagent can continuously be directed through the fluid bed. The material to surface coat can be fed to the plant through the "Feed" supply, and can be removed from the fluid bed at the bottom. The material in the fluid may be agitated. Magnetrons are used to supply the inside of the container (fluid bed) with microwaves. The reactor is equipped with two sets of double valves for fiber introduction and removal (secure handling of the microwaves) and has an elliptic cross section to enhance the dispersion of the microwaves irradiating out from the horn placed in the elliptic centre. The other centre is occupied with a material that is transparent microwaves, e. g. a polymer or ceramic plug. The centers are separated by a multiple of the micro wave wavelength. In this manner even heating without nodal points of intense heat can be maintained thus avoiding local overheating of the fibers. Stirring blades lifts the material and secure even distribution of heat and gas flow. The carrier nitrogen or air is re-circulated using a blower and carries the HCl gas formed during the reaction to a bed of 3 Å zeolite that binds the HCl and allow un-reacted reagent to be returned to the reactor. The zeolite can be continuously regenerated (not shown) by stripping in an external loop.

Figure 8:
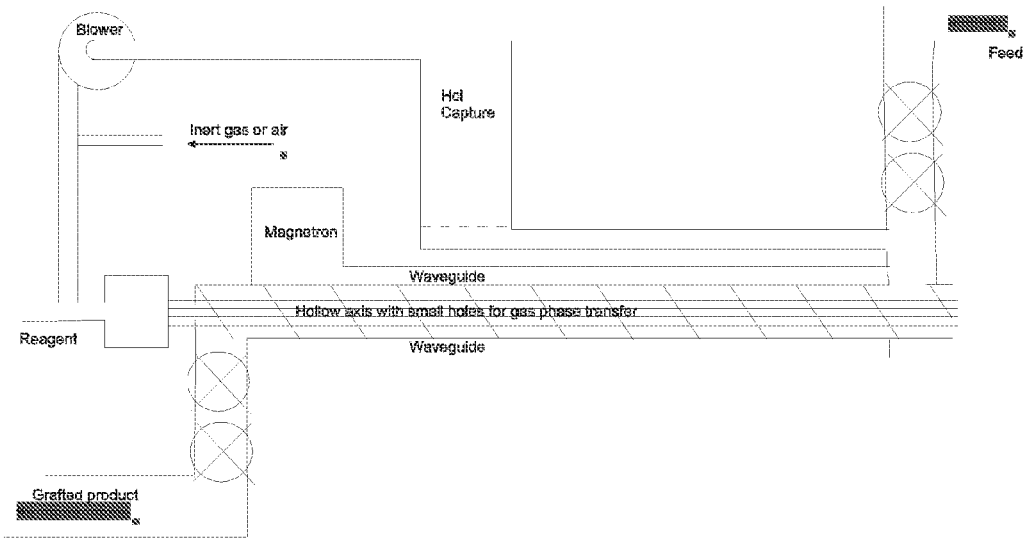
FIG. 8 shows an equipment for continuous microwave assisted grafting of fibers.

FIG. 8 shows an equipment for continuous microwave assisted grafting of fibers. The material to surface coat is entered through the "feed" supply, directed by the waveguides through the system wherein reagents are directed through the material through hollow axis with small holes for gas phase transfer. A magnetron supplies the system with microwaves. Grafted or surface treated products can be obtained from the system as indicated in the figure. Although not indicated, the temperature of the reagent as well as of the material subjected to the reagent in gas phase is controlled. If HCl is developed due to the linking of the compound to the surface of the material, this HCl can be captured e.g. by zeolite. Gas/reagent can continuously be directed through the fluid bed. In the horizontal snail a microwave is transported in a spiral waveguide around a cylinder with slits at the nodal points of the wave from where the energy is disseminated to the material in the snail. The snail itself is transporting the fiber material in countercurrent with a flow of inert gas containing the acylation reagent or another reagent. The HCl formed during reaction is carried to a bed of Zeolite and absorbed, allowing unused reagent to be returned to the reactor via a blower. The material is constantly moving through the reactor with a residence time of 5 min in the heating zone.

Disclaimers

In a preferred embodiment the grafting process as described herein above is performed without subjecting the material which is to be surface coated to a solution while performing the grafting process.

In a preferred embodiment the material which is to be surface treated is not subjected to further chemical changes other than the grafting of the acyl groups, silyl groups and/or alkyl groups to the surface.

EXAMPLES

The following examples are provided to illustrate embodiments of the invention and should not be regarded as being limiting for the invention.

Abbreviations:
PEGA=polyethyleneglycol poly acrylamide resin
HMBA=hydroxy methyl benzoic acid
TBTU=O(1H-Benzotrizol-1-yl)1,1,3,3-tetramethyl-uronium tetrafluoroborate, CAS no. 125700-67-6
DIEA=Di-isopropyl ethylamine.
DCM=Dichloromethane
DMF=NN' dimethylforamide.
TIPS=Triisopropylsilane
LCMS=liquid chromatography, mass spectrometry
HPLC=high-pressure liquid chromatography.
TFA=trifluoroacetic acid Example 1

Acryloylation in Solution: Preparation of Reference Material

Acryloylation in solution was performed using a procedure similar to the procedure for synthesis of soluble cellulose acetoacetates as described in Edgar K. J., Arnold K. M., Blount W. W., Lawniczak, J. E., Lowman D. W. *Macromolecules* 1995, 28, 4122-4128.

Barley straw was ground in a laboratory blender and further powdered three times in a FOSS CYCLOTEC 1093 sample mill. The average particle size of the powder was 36 to 360 to 590 µm. Three times powdered barley straw (5 g) was taken into a 500 ml RB flask fitted with a dropping funnel. Dichloromethan (DCM) dry 30 ml was added followed by addition of triethanolamine (TEA) (13.02 ml 93.75 mmol). The reaction mixture was maintained under argon and cooled in an ice bath. Methacryloyl chloride (9.027 ml, 93.75 mmol) was added drop wise within 30 min. After 1 h of stirring at 0° C., the ice bath was removed and the reaction mixture stirred at (22° C.) over night. After overnight reaction, the reaction mixture was cooled in an ice bath and methanol was added dropwise (30 mL) in 15 min. The reaction mixture was filtered and product washed with methanol, water, ethanol and DCM. The product was dried (4.3 g) under high vacuum.

A similar procedure was used for preparing cellulose acrylate/methacrylate except that crystalline cellulose was used instead of the barley powder and acryloyl chloride was used when appropriated.

A similar procedure was used for making cellulose acrylate/methacrylate as well as coconut fiber methacrylate.

Instead of grounded barley stray either crystalline cellulose (Sigma-Aldrich) or coconut fiber was used. The coconut fiber was cut into 3-5 mm bits using scissors prior to methacryloylation reaction. A schematic representation of the reaction performed in solution is shown in FIG. 1a.

A schematic representation of the corresponding reaction performed in gas phase is shown in FIG. 1b.

Example 2

Material sheets e.g. polymer sheets produced with materials surface coatected by the gas phase grafting technique described herein may be used in the rheology test described below.

Rheology Test

Material sheets e.g. polymer sheets prepared from materials surface coatected by the gas phase grafting technique described herein are cut to disc shape for tests by using a sawing machine. These discs are tested on a parallel plate type rheometer, NRM-2000, from Nippon Rheology Ki-Ki Co. Ltd. Plate radius is R=2×1 cm. Tests are conducted at different angular frequencies that are varied from 0×031 to 37×7 rad/s. All the measurements are taken at 185° C. Strain amplitude is kept constant at 10%. Steady shear rate applied on oscillatory flow of samples is varied in five steps as 0×01, 0×05, 0×1, 0×5 and 1×0 s−1.

Example 3

Example 3a

Vapour Phase Methacryloylation

In stead of using the method described in Example 1, material e.g. plant fiber material and plant material chips or powder material may also be prepared by a vapour phase reaction.

Vapour phase methacryloylation was carried out in 1 g scale, however the reaction may also be performed at larger scale. Microcrystalline cellulose was taken in a polypropylene syringe and capped using another fritted syringe. The setup was maintained at 80° C. in a sand bath and passed methacryloyl chloride vapours. Methacryloyl chloride was taken in a 500 ml RB fitted with a bubbler. A slow stream of dry argon was passed though the flask maintained at 60° C. The outlet was passed through a freeze trap cooled in a dry ice acetone mixture. After 6 hr, the reaction was stopped and product transferred to a sintered funnel and washed with methanol, water ethanol and DCM. The product dried under high vacuum. (Yield 1.15 g).

Instead of cellulose, grounded barley stray and/or coconut fiber may be methacrylated using this method.

Example 3b

Vapour Phase Methacryloylation: Time Course

Vapour phase methacryloylation is carried out in 2 g scale. Methacryloyl chloride and ethylacetate mixture (1:1) in a 500 ml RB flask fitted with a bubbler was evaporated with a slow stream of dry air, passed though the flask which was maintained at 60° C. Microcrystalline cellulose in a polypropylene syringe fitted with a fritte in both ends was maintained at 80° C. in a sand bath while methacryloyl chloride vapours was passed through. Unused reagent was trapped on a cold finger. The reaction was allowed to proceed for 6 h. Every hour 100 mg samples were removed. All samples were analyzed by the fluorescence assay of the example above. The reaction was quantitative after 1 h fluorescence intensity decreased slowly with extended exposure to the heat.

In order to get more accurate time course of the reaction, a second experiment was carried out same as above at 85° C. and samples were taken out at 5, 20, 35, 50 and 65 min. The analytical sample of the fibers is washed with methanol water ethanol and DCM. According to determination of the fluorescence by the fluorescence assay of the example above the reaction was complete within 20 min at this temperature.

In a separate experiment, paper-pulp-cellulose fibers were de-aggregated and dried under high vacuum for one day. Vapor phase methacryloylation was carried out on these fibers (1 g) as described above for 20 min-6 h. Fluorescence estimation shows a maximum of increase in fluorescence level compared to a blank sample after 20 min.

Example 3c

Methacryloylation in Laboratory Scale Reactor

Micro-sized barley straw fibers (50 g, treated with 0.32% NaOH at 80° C., washed and dried) is weighed into the assembled column of the laboratory scale gas phase grafting equipment and nitrogen is purged through. The column and the gas is warmed to 80° C. and the blower is started. The methacryloyl chloride was injected into the ethyl acetate. In a test run aliquots of product were retrieved at 5, 15, 30 min 1, 2, 3, 4 and 5 h. After 15 min the reaction is complete according to determination of fluorescence using the tetramethyl rhodamine assay described above. The reaction time is therefore maintained at 20 min with pre-heating. The excess reagent is removed by purging with nitrogen for 10 min with voluntary cooling. An analytical sample of the fibers is washed carefully with methanol water ethanol and DCM and was dried. The product is analyzed for the degree of derivatization and the incorporation of methacrylate groups is equivalent to that obtained in optimized solution reactions.

Example 3d

Large Scale Methacryloylation in Fluid Bed Reactor

The reactor is filled with nitrogen. Micro-sized barley straw fibers (3 m²) are fed into the fluid bed reactor through the bottom snail while the recirculation is used to maintain a fluidized bed. The gas is heated and methacryloyl chloride is added to maintain a saturated atmosphere. After 20 min equilibrium of reaction was reached and fibers were removed at the bottom snail for solid extraction while new fibers were added at the inlet at a rate of 9 m²/h. The fibers are cooled and excess of reagent is removed by a counter flow of nitrogen or air through the retrieved fibers. An analytical sample of the fibers is washed carefully with methanol water ethanol and DCM and was dried. The product is analyzed using the tetramethyl rhodamine test described above and derivatization is comparable with that obtained in the laboratory scale equipment.

Example 3e

Gas Phase Methacryloylation of Fibres Under Microwave Conditions

A) A laboratory scale experiment was carried out in a 5 mL reaction vial on a Liberty microwave instrument by passing $N_2$ carrying methacryloyl chloride vapor through cellulose powder (2 g). When equilibration with the vapor was reached the vial was heated to 90° C. for 5 min. The material was washed carefully with methanol water ethanol and DCM. It was dried and the degree of reaction was estimated to be almost quantitative by the above fluorescence based technique.

B) The vertical microwave reactor presented in the drawing above is first purged with nitrogen gas and filled with dry milled barley straw powder with an average particle size of 300 micrometer. The reactor is heated to 80° C. using microwave while passing methacryloyl chloride reagent (10% in ethyl acetate) added through the reagent tube and distributed by the carrier gas through a perforated tube inlet in the bottom of the reactor. The temperature of the heating zones are maintained at a maximum of 90° C. while the fibers are introduced and removed at a rate securing 10 min average residence time in the reactor. The fibers are cooled and excess of reagent is removed by a counter flow of nitrogen or air through the retrieved fibers. An analytical sample of the fibers is retrieved and washed carefully with methanol water ethanol and DCM. The sample is dried and the degree of reaction estimated to be almost quantitative using the above fluorescence based tetramethyl rhodamine test.

C) The horisontal microwave reactor presented in the drawing above is first purged with nitrogen gas. The reactor is heated to 80° C. using microwave while passing methacryloyl chloride reagent (10% in ethyl acetate) added through the reagent tube and distributed by the carrier gas through a perforated axis in the snail of the reactor. Dry milled barley straw powder with an average particle size of 300 micrometer was added through the inlet until the snail was filled. The temperature at the hottest zone of the reactor snail near the magnetron is maintained at a maximum of 90° C. Fibers are introduced and removed at a rate securing 10 min average residence time in the reactor. The fibers are cooled and excess of reagent is removed by a counter flow of nitrogen or air through the derivatized fiber product. An analytical sample of the fibers is retrieved and washed carefully with methanol water ethanol and DCM. The sample is dried and the degree of reaction estimated to be almost quantitative using the above fluorescence based tetramethyl rhodamine test.

Example 4

Estimation of Double Bonds on the Surface of Cellulose Fibers: Degree of Methacryloylation

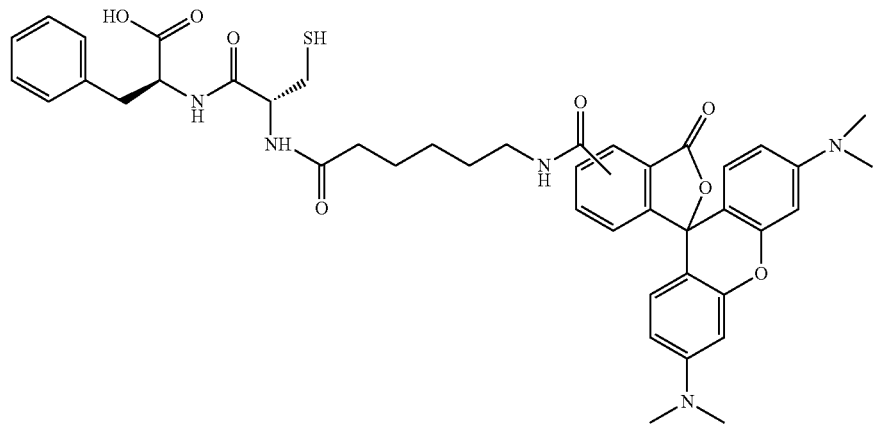

Tetramethylrhodamine was coupled to 6-aminohexanoyl-L-Cys(Trt)-L-Phe-HMBA-PEGA, (HMBA=hydroxymethylbenzamide) using the TBTU method of activation. The protection was removed with TFA, $H_2O$, triisopropyl silane and ethanedithiol; 98.5, 0.5, 0.5 and 0.5%. The resin was thoroughly washed, treated with DIEA/DMF (5%) and washed. The resin was dried and the peptide was cleaved off with 0.1% of NaOH for 2 h the product was filtered off and the resin was washed with 0.1 M NaOH. The filtrate and washings were neutralized with HCl (1M) and lyophilized. HPLC of the product showed only the two isomers from the fluorophore (5 and 6 carboxylate) and was used without further purification for labeling double bonds by Michael addition.

The double bonds on the surface modified fibers were reacted with a dilute solution (but excess) of the fluorophore. A blank and a methacryloylated cellulose sample (25 mg) were weighed into a fritted syringe, washed with PBS and with TCEP (0.1 M) to reduce accessible disulfide bonds. The fibers in PBS (250 mL) were reacted with 150 microgram of the dye in 15 mL of DMF. The reaction was left for 3 h with occasional shaking. The reagents were removed with washing and the blank and the methacryloylated samples were compared under a fluorescence microscope and the fluorescence was quantitatively determined. The fluorescence of the methacryloylated sample (Reading 3300) was 11 fold over a background sample lacking methacroylation and treated in the same manner.

Determination of Degree of Methacryloylation

The free thiol group in the dye prepared in the example above react with the double bonds on the surface modified barley straw or cellulose. This gives increased fluorescence compared to un-modified fibre/cellulose. The fluorescence intensity is measured under a fluorescence microscope by recording relative fluorescence values from images using the image software Metamorph.

In a typical experiment, methacryloylated cellulose and a blank cellulose sample are weighed (25 mg) into separate 5 mL syringes fitted with a frit. The samples are washed twice with PBS buffer (250 µl, 0.1 M) containing TCEP (0.1 M). PBS reaction buffer (250 µl) is added to the sample followed by addition of dye stock solution (10 µg/µl) in DMF (15 µl). The reaction mixture is thoroughly mixed and kept at room temp with occasional shaking for 3 hrs. The samples are washed with water and DMF, kept in DMF over night and further washed with water left in water over night and final water wash. The samples was transferred to an 8 well titre-plate (500 µl water) and viewed under fluorescence microscope (ZEISS inverted microscope AXiOVERT 200M). Images of blank and samples were recorded under identical conditions and analyzed using the MetaMorph Meta Imaging series environment (Molecular Devices)

Example 5

Biodegradability Study

The tests are performed to determine whether biodegradation of polymeric materials and other organic components in the plastic product can occur and optionally also to improve the understanding of the degradation mechanism.

The test methods are standard methods for assessing the compostability of environmentally degradable plastics and are further described in Standard Guide for Assessing the Compostability of Environmentally Degradable Plastics; American Society for Testing and Materials (ASTM) D 6002-96 (Reapproved 2002).

The test method numbers also refer to above mentioned standard.

In addition, reference is made to "Test methods and standards for biodegradable plastics: K. J. Seal In chemistry and technology of biodegradable polymers: Ed. G. J. L. Griffin. Pub. Blackie Academic & Professional, UK @ 1995".

Biodegradation is based on carbon dioxide production. The following test methods may be used to determine biodegradability of polymer materials, monomeric subunits of the polymer, and other organic components:

Example 5a

Test Method D 5209 (Sturm Test)

This aqueous test method uses a fresh sample of activated sewage sludge that has been aerated, homogenized, and settled. The supernatant is used as the inoculum. It contains primarily a mixed bacterial population that promotes rapid biodegradation under mesophilic conditions. The metabolism of test materials produces $CO_2$, which is trapped in alkali solution and quantified by titration. The test length is 30 days if nothing else is indicated. It is however possible to perform the test with an extended test length if the medium is reinoculated. A positive result (recovery of at least 60% of theoretical $CO_2$ after 30 days) indicates that the material will also be biodegrade in a composting environment.

A negative result is confirmed by a laboratory thermophilic composting test such as Test Method D 5338. The contribution of nonmicrobial degradation are quantified by including sterile or poison controls and comparing changes in molecular weight or mass.

Example 5b

Soil Contact Test (Test Method D 5988)

This static test uses a defined sand/soil/mature compost matrix to provide a consortium of mesophilic and thermophilic bacteria and fungi. Biodegradation is measured in a manner similar to the Sturm test, based on the amount of material carbon converted to gaseous carbon ($CO_2$). Readily biodegradable materials can be screened in 30 to 60 days. Recovery of 60%+ of theoretical $CO_2$ after 60 days is considered a positive result. A negative result should be confirmed under thermophilic composting conditions (Test Method D 5338).

Example 5c

The following test method is used for establishing the biodegradation rate of a polymeric material in a composting environment.

Test Method D 5338 is for establishing the biodegradability of a polymer material in a composting environment. Material biodegradability is based on the amount of material carbon recovered as gaseous carbon ($CO_2$) relative to the amount of material carbon originally added to the compost. Biodegradation rates or end points should be compared to the reference materials described in below.

If a negative result is obtained, the controls described are tested in the test method or the test method is repeated with a lower dose closer to field-use levels.

Products or polymer materials may be compared under identical conditions to natural reference materials known to be biodegradable in a composting environment for example, cellulose or starch. Other materials considered as biodegradable within this context are oak, maple, and corn leaves and craft paper. Unmodified polyethylene film, typically used to collect yard trimmings, is in this context considered a negative reference material.

The recovery of all material carbon as gaseous carbon ($CO_2$) may be impractical due to the incorporation of material carbon into microbial biomass or stable humic substances. Thus, recovered $CO_2$ should be compared to recovered $CO_2$ of the positive and negative controls. A recovery rate of $CO_2$ (i.e. % $CO_2$ recovered of total possible) of at least 50%, preferably at least 60%, more preferably at least 70%, yet more preferably at least 80% of the recovery rate of $CO_2$ of the positive control is considered a positive result and such materials are considered biodegradable according to the invention.

The test duration is 45 days if nothing else is indicated, but it may be extended to simulate field conditions.

Example 5d

Soil Burial Tests

The polymer material to be tested is buried in soil beds prepared in the laboratory using standard sieved soil. The soil beds are normally conditioned up to 4 weeks prior to use and may be supplemented with organic fertiliser to encourage an active microbial flora. The soil beds containing the samples are incubated at a constant temperature for between 28 days and 6 months. The moisture content is set at 30-40%. Samples are removed for assessment of changes in their properties such as weight loss, mechanical strength changes or microscopic examination to assess surface damage and to look for the presence and nature of microbial growth.

Example 9

Methacryloylation

FIG. 1b shows a reaction scheme for a preferred method of methacryloylation according to the present invention.

The method is useful for preparing grafting acyl groups, silyl groups and/or slkyl groups as described herein onto a material e.g. a plant fiber material. For preparation of plant fiber material a plant fiber is provided e.g. chips of any of the plants mentioned herein. Material e.g. cellulose/plant material/plant fiber is first dried under a stream of dry air and then treated with acylation, silylation and/or alkylation reagents in gas phase and a carrier gas e.g. nitrogen at a temperature of about 80° C. The product is characterized by fluorescence dye assay.

The invention claimed is:

1. A method for coating a material with at least one acylation reagent to provide acyl group(s) at the surface of the material, wherein said method is a dry process and wherein said method comprises the steps of:
   a) providing a material consisting of milled plant fiber, wherein the milled plant fiber comprises lignin and hemicellulose,
   b) providing at least one acylation reagent, selected from the group consisting of compounds of the formula:

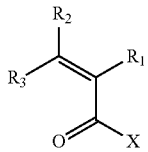 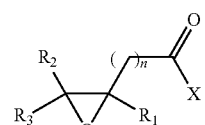

wherein X is selected from the group consisting of
      a halogen,
      a mixed carbonic anhydride, and
      a mixed anhydride,
   wherein $R_1$, $R_2$ and $R_3$ of the acylation reagent are H, $C_{1-3}$-alkyl, or $C_{1-3}$-alkenyl; and n=0-3, c) contacting said material consisting of milled plant fiber, wherein the milled plant fiber comprises lignin and hemicellulose with said acylation reagent, wherein said reagent is kept in gas phase, and
   d) obtaining a coated material which at the surface comprises covalently —O-linked residues comprising an acyl group.

2. The method according to claim 1, wherein the acylation reagent is

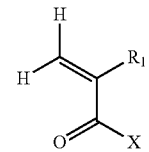

wherein X=F, Cl, or Br, and $R_1$=H or $CH_3$.

3. The method according to claim 1, wherein the acylation reagent is methacryloyl chloride ($C_4H_5ClO$) and/or acryloyl chloride ($C_3H_3ClO$).

4. The method according to claim 1, wherein the contacting of the acylation reagent(s) with the material in step c) is a dry process.

5. The method according to claim 1, wherein the material consisting of milled plant fiber consists of milled roots, milled stems, milled leaves, milled flowers, milled fruits, milled seeds, or a mixture thereof.

6. The method according to claim 1, wherein the acylation reagent is turned into a gas and mixed with a carrier gas to form a gas mixture, and wherein the gas mixture is further directed past the material for a period of time sufficient to surface coat the material during step c).

7. The method according to claim 6, wherein the carrier gas is selected from the group consisting of nitrogen, oxygen, and argon.

8. The method according to claim 1, wherein HCl is produced in step c) and said HCl is removed.

9. The method according to claim 8, wherein the HCl is removed by being trapped by zeolite.

10. The method according to claim 1,
    further comprises the material consisting of milled plant fiber, wherein the milled plant fiber further comprises cellulose, and the acylation reagent is provided with the following compound:

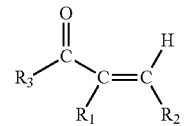

wherein $R_1$ and $R_2$ independently are selected from the group consisting of —H, $C_{1-3}$ alkyl, and $C_{1-3}$ alkenyl, and $R_3$ is selected from the group consisting of halide or alkyl halide,
    and wherein the coated material obtained in step d) contains cellulose covalently —O-linked with said acylation reagent compound.

11. A method of preparing a polymer network, comprising: a. preparing the coated material according to the method of claim 1, and b. anchoring the coated material into polymer networks formed by radical polymerizations or anion or cation catalyzed ring opening polymerizations.

12. A method of preparing a product, comprising: a. preparing the coated material according to the method of claim 1; and b. mixing the coated material with a plastic to produce a mixture; and c. forming the mixture into a product.

13. The method of claim 1, wherein the material consisting of milled plant fiber consists of milled cereal straw.

14. The method of claim 13, wherein the milled cereal straw is milled barley straw.

15. The method of claim 1, further comprises the material consisting of milled plant fiber, wherein the milled plant fiber further comprises cellulose, and the method also further comprises, after contacting the material with the acylation reagent in step c), reacting hydroxyl groups in the glucose units of said cellulose with the acylation reagent in the following reaction:

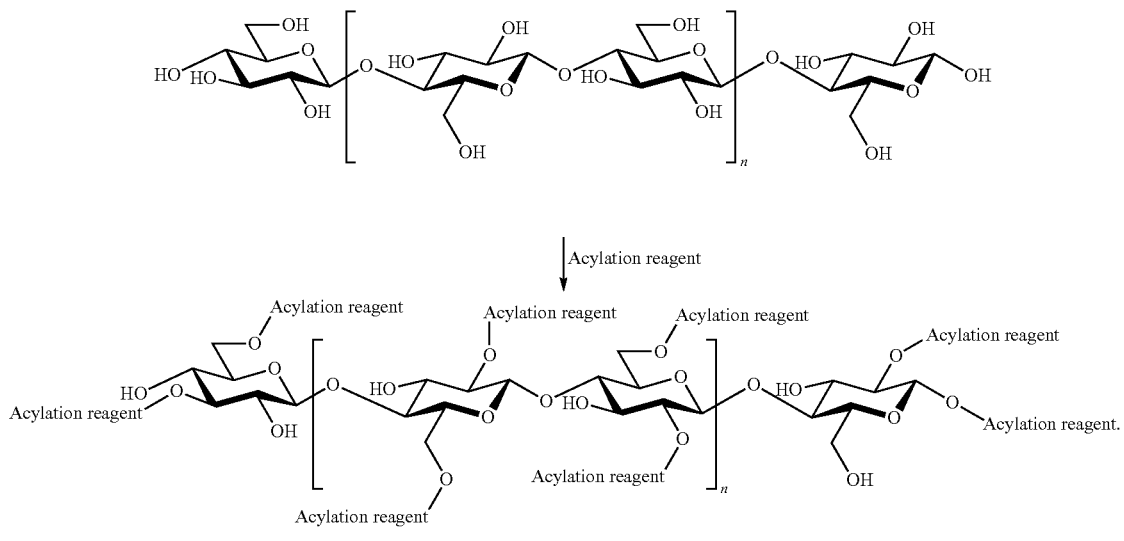

* * * * *